United States Patent [19]

Nakata

[11] Patent Number: 5,498,944
[45] Date of Patent: Mar. 12, 1996

[54] AUTOMATIC FOCUSING APPARATUS

[75] Inventor: Masahiro Nakata, Tokyo, Japan

[73] Assignee: Asahi Kogaku Kogyo Kabushiki Kaisha, Tokyo, Japan

[21] Appl. No.: 119,842

[22] Filed: Sep. 13, 1993

[30] Foreign Application Priority Data

Sep. 11, 1992 [JP] Japan ................................ 4-243437

[51] Int. Cl.⁶ .................... G03B 3/10; H02P 3/12
[52] U.S. Cl. ................ 318/640; 318/375; 354/400; 354/430
[58] Field of Search ........................ 348/345, 348, 348/349, 352, 357, 361; 354/400, 402, 403, 430, 195.1, 402, 412; 358/222, 228, 227; 318/560–648; 388/800, 14 890

[56] References Cited

U.S. PATENT DOCUMENTS

| | | | |
|---|---|---|---|
| 4,054,819 | 10/1977 | Johnson | 318/269 |
| 4,544,868 | 10/1985 | Murty | 318/254 |
| 4,690,537 | 9/1987 | Ando | 354/402 |
| 4,868,592 | 9/1989 | Suzuki et al. | |
| 4,897,683 | 1/1990 | Suzuki et al. | |
| 4,936,664 | 6/1990 | Haraguchi et al. | |
| 4,952,962 | 8/1990 | Suzuki et al. | |
| 4,967,218 | 10/1990 | Numako et al. | |
| 5,057,859 | 10/1991 | Ishimaru | 354/600 |
| 5,066,968 | 11/1991 | Suzuki et al. | |
| 5,107,293 | 4/1992 | Sekine et al. | 354/430 |
| 5,128,769 | 7/1992 | Arai et al. | 358/228 |
| 5,155,797 | 10/1992 | Nomura et al. | 388/815 |
| 5,162,831 | 11/1992 | Haraguchi et al. | |
| 5,192,965 | 3/1993 | Suzuki et al. | |
| 5,210,563 | 5/1993 | Hamada et al. | 354/400 |
| 5,218,394 | 6/1993 | Ueda et al. | 354/402 |
| 5,218,442 | 6/1993 | Hamada et al. | 358/222 |
| 5,220,257 | 6/1993 | Yoshino et al. | 318/254 |
| 5,239,330 | 8/1993 | Uenaka | |
| 5,243,372 | 9/1993 | Suzuki et al. | |
| 5,255,043 | 10/1993 | Kawasaki | |
| 5,258,799 | 11/1993 | Tanii et al. | 354/402 |
| 5,266,981 | 11/1993 | Hamada et al. | 354/400 |
| 5,270,767 | 12/1993 | Hamada et al. | 354/430 |
| 5,335,032 | 8/1994 | Onuki et al. | 354/195.1 |
| 5,335,042 | 8/1994 | Imafuji et al. | 354/430 |
| 5,361,022 | 11/1994 | Brown | 318/375 |

*Primary Examiner*—Paul Ip
*Attorney, Agent, or Firm*—Sandler, Greenblum & Bernstein

[57] ABSTRACT

An automatic focusing apparatus having an object distance data detecting mechanism having an optical system which includes a focusing lens assembly which can be driven by a motor, and a mechanism for detecting an angular velocity of the motor. The optical system further includes a motor driving mechanism for driving the motor in a direction and at an angular velocity based on object distance data obtained by the object distance data detecting mechanism to move the focusing lens assembly, and a mechanism for controlling the motor. When the motor is instructed to be stopped, the angular velocity is reduced to a predetermined value. The controlling mechanism is effected in accordance with the angular velocity detected by the velocity detecting means.

30 Claims, 31 Drawing Sheets

AUTOMATIC FOCUSING APPARATUS

BACKGROUND OF THE INVENTION

1. Field of the Invention

The present invention relates to a motor controlling apparatus which ensures fast starting, stopping or reversing of the motor. More precisely, the invention relates to an automatic focusing device having such a motor controlling apparatus.

2. Description of Related Art

In recent single lens reflex cameras, the number of devices or components incorporated therein, including an automatic focusing device or a powered zoom lens, etc., that are driven by the rotation of the motor, or motors, has increased. The motors repeat frequent starting, stopping and reversing operations. Upon starting, it is necessary for the motors to reach a predetermined rotational speed, or a maximum rotational speed, as quickly as possible. Similarly, upon decelerating, stopping or reversing, the motors must be decelerated, stopped or reversed as quickly as possible. Accordingly, it is necessary to reduce the time required for the accelerating motor to reach a predetermined speed, or to reduce the time required for the decelerating motor to come to a stop.

One of the solutions of this problem would be to provide a mechanical brake as a stopping means. However, this would put limitations on the size and weight of the camera, which is a major consideration in the construction of a compact camera.

SUMMARY OF THE INVENTION

The primary object of the present invention is to provide a motor controlling apparatus of an automatic focusing device in which the motor can be stopped within an extremely short period of time, thereby speeding up the movement of a lens or lenses.

To achieve the object mentioned above, according to an aspect of the present invention, a motor controlling apparatus is provided that includes a rotational speed (i.e., angular velocity) detecting mechanism for detecting the rotational speed of a motor, and a controlling mechanism for "braking" the motor (hereinafter "braking" is used to indicate angular velocity control in general) in accordance with the rotational speed detected by the rotational speed detecting mechanism.

According to another aspect of the present invention, an automatic focusing apparatus is provided that includes an object distance measuring mechanism, an optical system having a focusing lens assembly that can be driven by a motor, an encoder that detects the rotational speed of the motor, and a motor controlling mechanism for driving the focusing lens assembly in a direction and at a rotational speed based on the object distance data obtained by the object distance measuring mechanism. A braking mechanism is provided to brake the motor until the rotational speed thereof is reduced to a predetermined value depending on the rotational speed of the motor.

The present disclosure relates to subject matter contained in Japanese patent application No. HEI 4-243437 (filed on 9/11/92) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
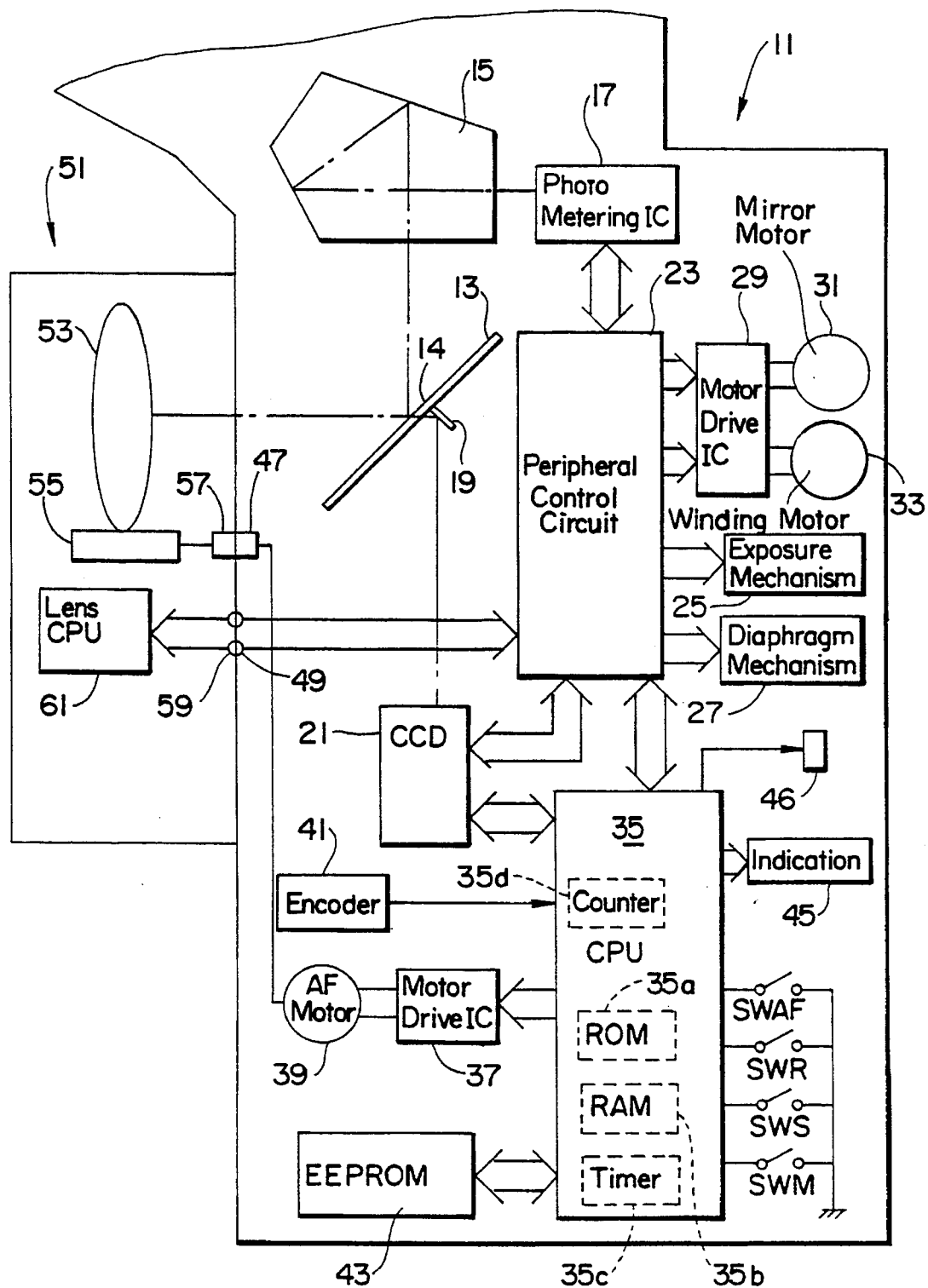
FIG. 1 is a block diagram of a single lens reflex camera having a motor controlling apparatus and an automatic focusing device, according to the present invention.

The block diagram of FIG. 1 shows main components of an automatic focusing (AF) single lens reflex camera to which the present invention is applied. Included in the diagram are a camera body 11 and a taking lens 51 which can be detachably attached to the camera body 11.

A large part of light reflected from an object to be photographed enters the camera body 11 through the taking lens 51 and is reflected by a main mirror 13 towards a pentagonal prism 15, which constitutes a finder optical system. The light is then partly reflected by the pentagonal prism and is made incident upon a light receiving element (not shown) of a photometering IC 17. Light incident upon a half mirror portion 14 of the main mirror 13 is transmitted therethrough and is reflected by an auxiliary mirror 19 towards an object distance metering CCD sensor unit 21.

The light receiving element of the photometering IC 17 outputs electrical signals corresponding to the quantity of light received thereby, and the electrical signals are logarithmically compressed. The logarithmically compressed electrical signals are input through a peripheral element control circuit 23 to a main CPU 35 (control means) in which the analog signals are converted to digital signals.

The main CPU 35 calculates the exposure to obtain an optimum shutter speed and an optimum diaphragm value in accordance with the photometering signals (i.e., object brightness data) and film sensitivity data. Based on the shutter speed and diaphragm value thus obtained, the release operation is carried out, that is, an exposure mechanism (i.e., shutter mechanism) 25 and a diaphragm mechanism 27 are driven to provide proper exposure for the film. When the release operation is effected, the peripheral element control circuit 23 drives a mirror motor 31 through a motor drive circuit 29 to move the main mirror up and down. When exposure is completed, the winding motor 33 is driven by the peripheral element control circuit 23 to wind the film.

The CCD sensor unit 21 is in the form of a phase difference type object distance measuring sensor including a splitting optical system which splits the object light into two bundles of light and a CCD line sensor which integrates the split bundles of light received thereby (photoelectric conversion and accumulation of electric charges). The CCD sensor unit 21 outputs integration data obtained by the CCD line sensor to the main CPU 35. The CCD sensor unit 21 and the main CPU 35 are driven and controlled by the peripheral element control circuit 23. The CCD sensor unit 21 is provided with a monitor element (not shown) through which the peripheral element control circuit 23 detects the brightness of the object, so that the integration time of the CCD line sensor is controlled in accordance with the object brightness.

The main CPU 35 performs the prediction calculation to obtain a degree of defocus (referred to as a defocus value hereinafter), in accordance with the integration data output from the CCD sensor unit 21, to thereby calculate the direction of rotation and the number of revolutions of the AF motor 39 (i.e., the number of pulses of the encoder in accordance with the defocus value. The main CPU 35 causes the AF motor drive circuit 37 to drive the AF motor 39 in accordance with the direction of rotation and the pulse number thus obtained. The main CPU 35 counts the number of pulses output from the encoder 41 in association with the rotation of the AF motor 39. When the counted value reaches the pulse number, the main CPU 35 stops the AF motor 39. The main CPU 35, which normally drives the AF motor 39 by a DC control (DC drive), drives the AF motor 39 at a constant speed by a PWM (pulse width modulation) control in accordance with the interval of the output pulses of the encoder 41. The rotation of the AF motor 39 is transmitted to the taking lens 51 through a joint 47 provided on a mount of the camera body 11 and a joint 57 provided on a mount of the taking lens 51 and connected to the joint 47 of the camera body.

The DC-drive of the AF motor 39 refers to a driving thereof substantially at a direct current. The constant speed control (i.e., constant speed drive) of the AF motor 39 refers to a driving of the AF motor at a predetermined constant speed and is basically realized by the PWM control in the illustrated embodiment of the present invention. In particular, in the present invention, a time ratio (i.e., supply ratio) of a power supply time and a non-supply time in one cycle is varied, and the AF motor 39 is slightly braked in the non-supply time.

Upon transferring from the DC drive to the PWM drive or upon varying the rotational speed of the AF motor 39 during the PWM control, the AF motor is subject to a brake force in the reverse direction for the time corresponding to the supply ratio, thereby entailing a quick change in the rotational speed thereof.

The main CPU 35 includes a ROM 35a in which a predetermined program is stored, a RAM 35b in which calculation and control data is temporarily stored, a counting reference timer 35c, and a counter 35d (as hardware). An external memory EEPROM 43 is connected to the main CPU 35. Inherent constants of the camera body 11, as well as various functions and constants necessary to perform the moving object prediction AF calculation are stored in the EEPROM 43.

Connected to the main CPU 35 are, a photometering switch SWS which is turned ON when a release button (not shown) is half-depressed or fully depressed, and a release switch SWR which is turned ON by the full-depression of the release button. Further connected to the main CPU 35 are an automatic focusing switch SWAF which is actuated to switch an automatic focus controlling operation and a manual focus control, and a main switch SWM which is actuated to turn the power source ON or OFF to cut the power supply to the main CPU 35 or the peripheral elements or components, etc. The main CPU 35 indicates the set AF, set exposure, selected photographing mode, selected shutter speed and diaphragm value, etc., in one or more indicators 45 usually provided on an outer surface of the camera body 11 and/or within the finder (field of view).

The main CPU 35 functions as a controlling means for generically controlling the whole camera system. In addition, the main CPU 35 constitutes a photometering means and a defocus value metering means together with the CCD sensor unit 21 and the peripheral element control circuit 23, etc.; and a lens driving means together with the AF motor 39, etc. Further, the main CPU 35 constitutes a continuous photographing means together with the peripheral element control circuit 23, the motor drive IC 29, the mirror motor 31, and the winding motor 33, etc.; and, a focus judging means and a moving object judging means; respectively.

The taking lens 51 is provided with a focus adjusting mechanism 55 which drives the focusing lens assembly 53 in the optical axis direction. A lens joint 57 is provided on the lens mount of the taking lens and connectable to the corresponding body joint 47 of the camera body 11 to transmit rotation of the AF motor 39 to the focus adjusting mechanism 55. A lens CPU 61 calculates various data associated with the taking lens 51, with the lens CPU 61 being connected to the peripheral element control circuit 23 through electrical contact groups 59 and 49 connected to each other, so that data communication between the main CPU 35 and the lens CPU 61 is executed through the peripheral element control circuit 23.

Data to be transmitted to the peripheral element control circuit 23 from the lens CPU 61 includes a controllable open diaphragm value Av, a maximum diaphragm value Av, longest and shortest focal lengths, a current focal length, and K value data, etc. Note that the "K value data" refers to pulse number data (or, the number of revolutions of the AF motor 39) output from the encoder 41 by a unit displacement (e.g., 1 mm) of an image plane formed by the taking lens 51 in the optical axis direction when the AF motor 39 is activated to perform the focusing operation.

The single lens reflex camera commences the AF operation as soon as the photometering switch SWS is turned ON. In the AF operation, the object distance measuring CCD sensor unit 21 starts the integration. Upon completion of the integration, the main CPU 35 calculates the defocus value and the number of the drive pulses in accordance with the integration data input to the main CPU 35.

Consequently, the AF motor 39 is driven in accordance with the drive pulse number. The AF mode in the AF operation according to the present invention corresponds to a normal AF mode when the object to be photographed is a still object, but when the object is a moving object, the AF mode is equivalent to a moving object prediction AF mode in which the movement of the object is traced. Furthermore, in the present invention, there are a release priority release mode, in which the releasing can be effected even in an out-of-focus state, and a focus priority release mode, in which the releasing can be effected only in an in-focus state.

The AF operation of the single lens reflex camera will be described below with reference to FIGS. 2 through 5 which show a relationship between the position of the object image (i.e., image plane) on the optical axis, with respect to a reference position defined by the position of the focusing lens assembly 53 (i.e., optical center), and the position of a plane equivalent to the film plane (i.e., focal point). In FIGS. 2 through 5, the position of the object image located at a level higher than the focal point corresponds to rear focus and corresponds to an object being close to the camera. Label "I" designates the integration operation by the object distance measuring CCD sensor unit 21. Label "C" designates the calculation of the defocus value and the drive pulse number (i.e., defocus pulse number) based on the integration data. Label "M" designates the driving operation of the AF lens by the AF motor 39.

Figure 2:
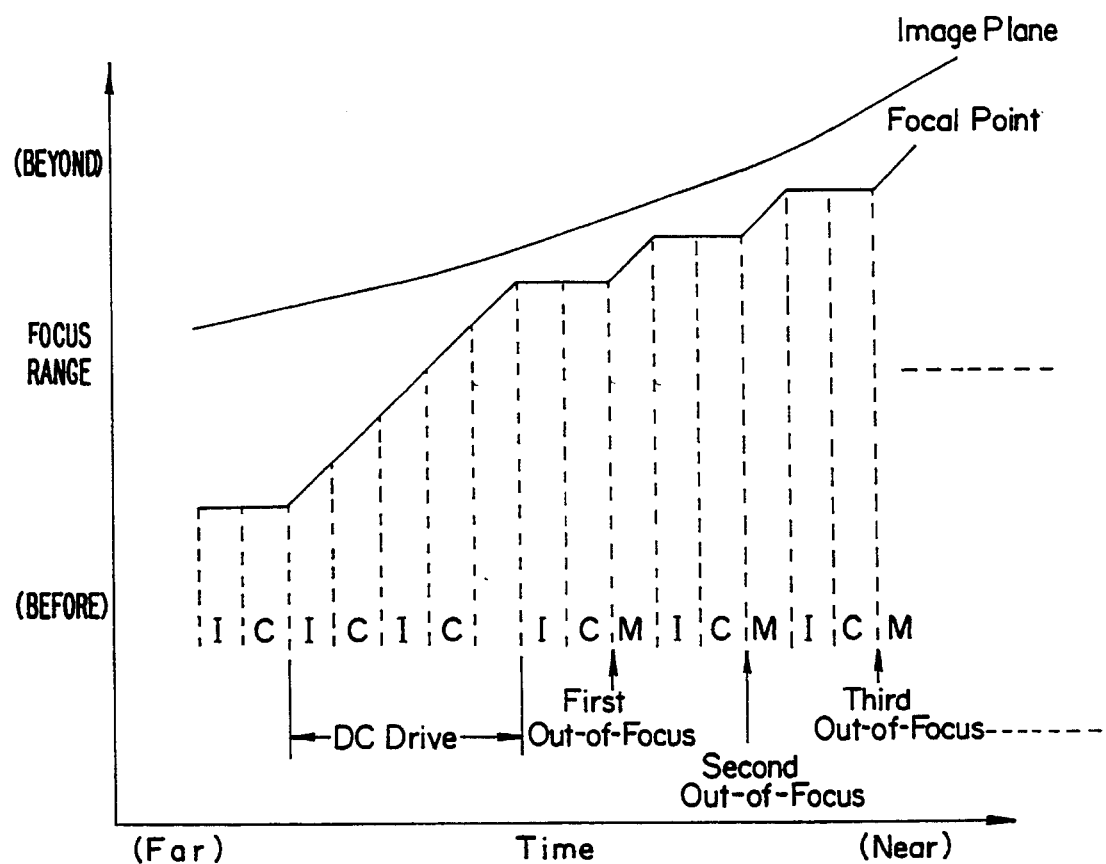
FIG. 2 is a diagram of a variation of focal points in an AF operation before control enters an operation in a moving object prediction mode, in the automatic focusing device shown in FIG. 1.

FIG. 2 shows the normal AF operation before control enters the moving object tracing AF operation (i.e., moving object prediction AF mode). When the photometering switch SWS is turned ON to start the AF operation, the driving of the lens assembly (i.e., operation of AF motor 39) is carried out based on the displacement (i.e., drive pulse number) obtained by the first integration I and the calculation C. In the illustrated embodiment, if the defocus value (i.e, drive pulse number) is above a predetermined value, the integration and the calculation are repeated during the lens drive. If the defocus value is below a predetermined value during the repeated integrations and calculations, integration and calculation are stopped, and the lens is driven through a displacement obtained by the most recent integration and calculation. The object distance measuring operation includes the integration and calculation operations mentioned above. The AF operation includes integration, calculation and the lens driving operation.

If the first lens driving operation is completed, the integration and the calculation are carried out again. Thereafter, whether or not the lens assembly is moved to the focal point by the lens driving operation is checked. If the lens assembly is in-focus, it could be assumed that the object is not moving. Nevertheless, to confirm that the object is not moving, control does not proceed for a certain period of time. Thereafter, the object distance measuring operation is again carried out and, for example, if the defocus value is above a predetermined level, the lens driving operation is effected.

If control is interrupted by the operation of the release switch SWR during the waiting period, the release operation is executed. If there is no interruption, the object distance measuring operation and the lens driving operation are repeated as long as the photometering switch SWS remains ON.

Figure 3:
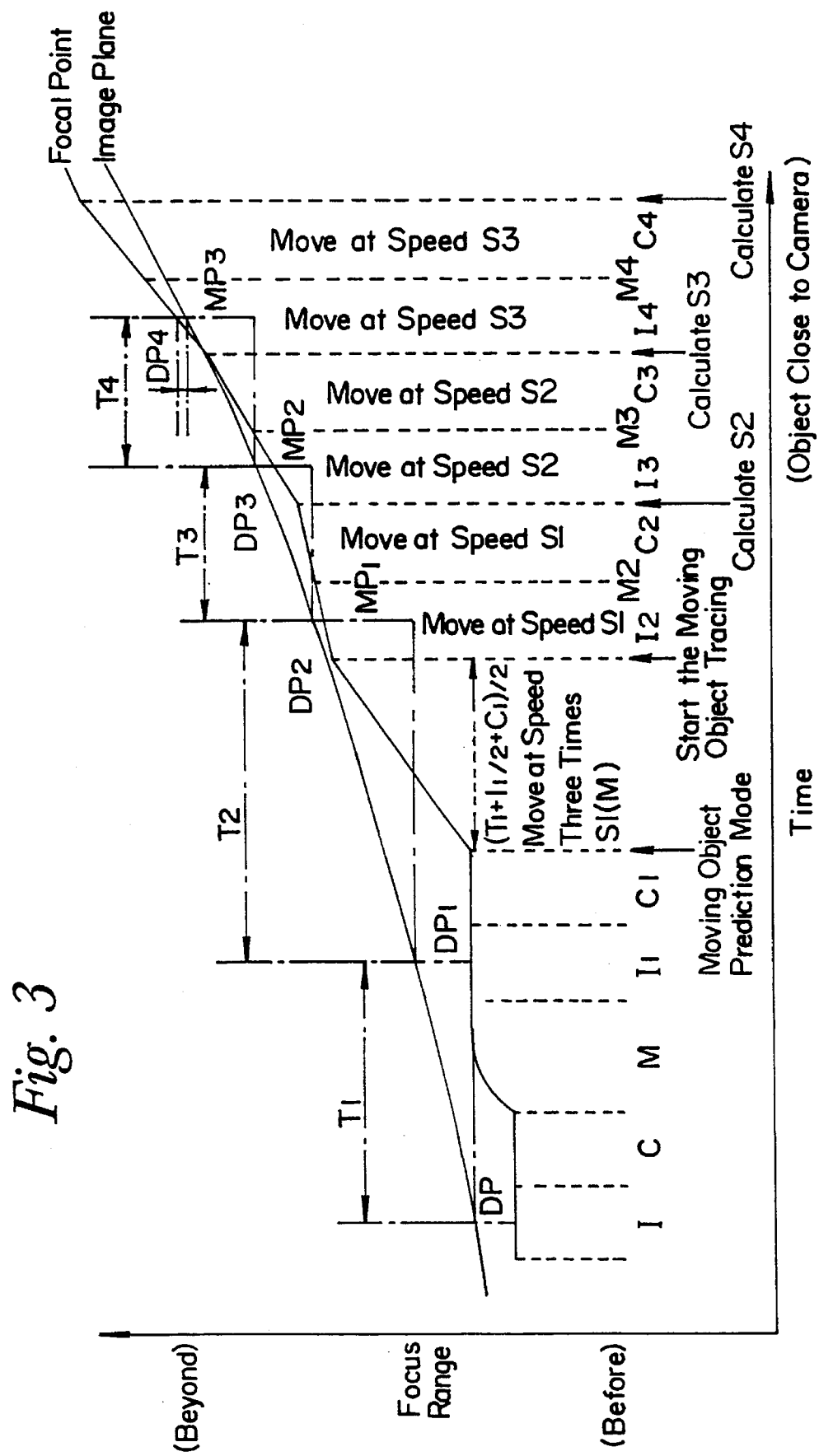
FIG. 3 is a diagram of a variation of focal points in a moving object prediction mode operation, in the automatic focusing device shown in FIG. 1.

If a "not in-focus" state occurs during consecutive checking operations (e.g., three checking operations), it is deemed that the object is moving, and control enters the moving object prediction AF mode (FIG. 3).

Figure 4:
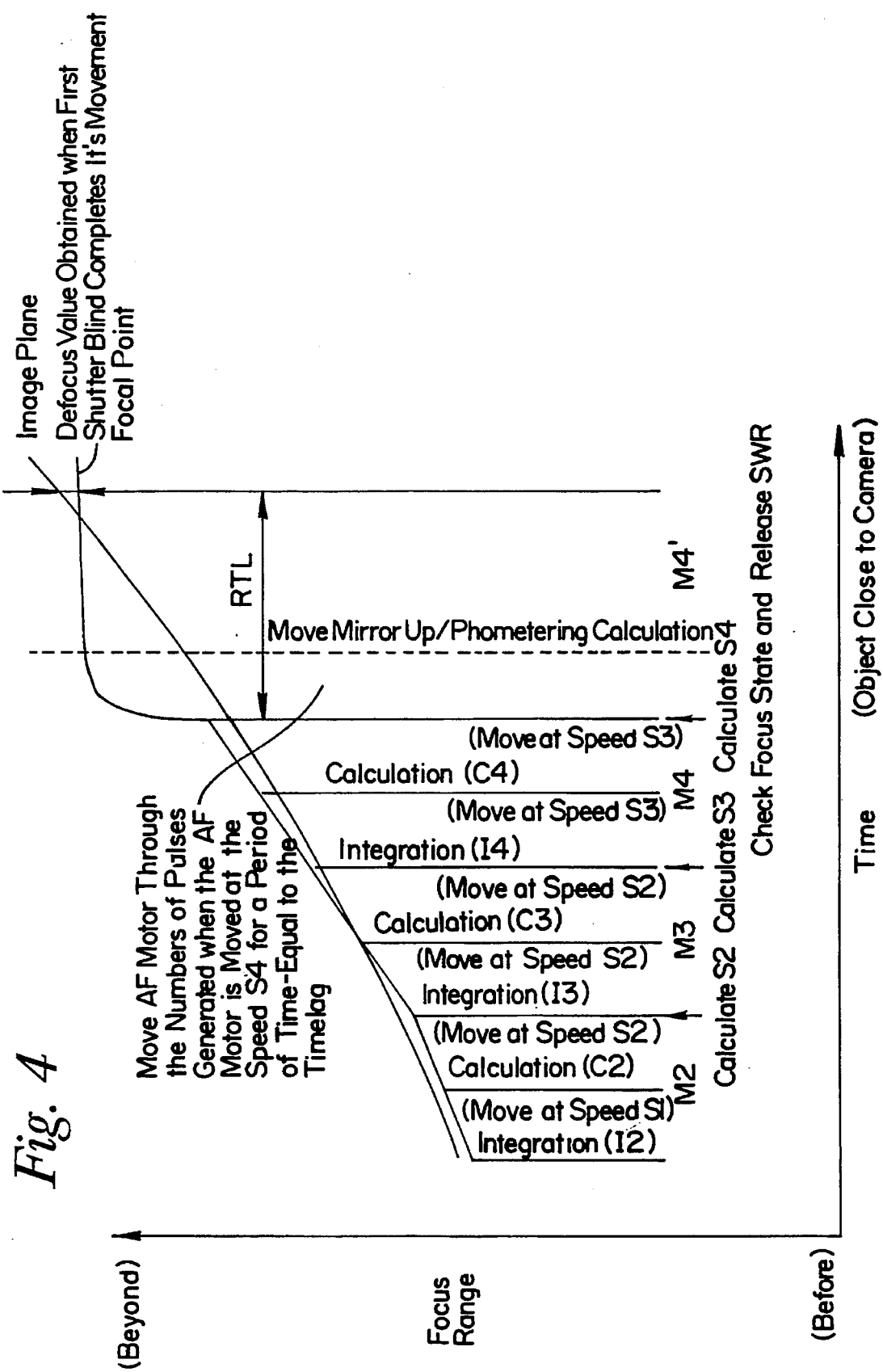
FIG. 4 is a diagram showing a variation of focal points when a release switch is actuated in an a moving object prediction mode operation, in the automatic focusing device shown in FIG. 1.
Figure 5:
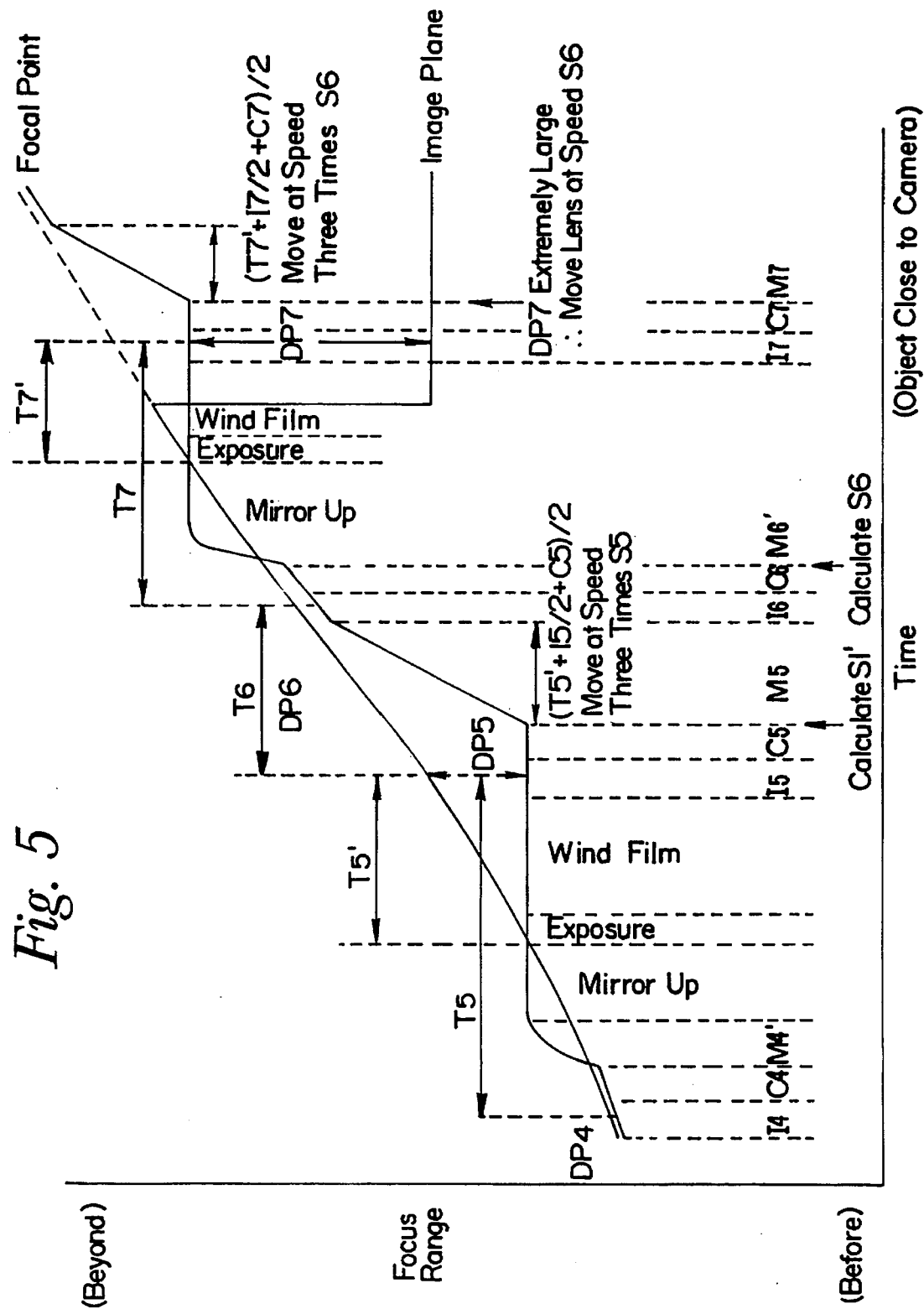
FIG. 5 is a diagram of a variation of focal points when a main moving object is out of a measuring zone during continuous shooting in a moving object prediction mode, in the automatic focusing device shown in FIG. 1.

Tracing of Moving Object:

The following discussion will be directed to the AF operation for the moving object (FIGS. 3 through 5).

If the defocus pulse DP is obtained as a result of the calculation (i.e., defocus calculation) C based on the integration I, the lens drive M (including the DC drive and the PWM drive) is carried out to move the lens assembly by a displacement corresponding to the defocus pulse DP.

If the defocus pulse $DP_1$ obtained by the integration $I_1$ and the calculation $C_1$ performed immediately after the completion of the lens drive M is above a predetermined value, the moving speed $S_1$ of the object image plane (i.e., moving object tracing speed) and the lens driving time are calculated.

The tracing speed $S_1$ at which the object image is moved within the space of time $T_1$ between the median points of the integration I and $I_1$ is obtained by the following formulae.

$$X_1 = T_1/DP_1 \text{ (ms)} \qquad \text{①}$$

$$S_1 = 1/X_1 \qquad \text{②}$$
$$= DP_1/T_1 \quad \text{(pulses/ms)}$$

wherein X, designates the output period (ms) of the pulses of the encoder 41.

The moving object tracing speed $S_1$ thus obtained by the calculation is substantially identical to the actual moving speed of the object image plane.

The lens driving time is given by the following formula:

$$\{T_1 + (I_1/2) + C_1\}/2 \qquad \text{③}$$

The lens assembly is moved at a speed three times the moving object tracing speed $S_1$ for the lens driving time obtained by the equation ③ mentioned above, as indicated at $M_1$ (i.e., treble drive $M_1$). Consequently, the focusing lens assembly 53 can be moved to the focal point or the vicinity thereof within an extremely short space of time. Note that the multiple is not limited to three (treble), it could be two (double), four (fourfold) or more. In case of double speed, the driving time is 1.5 times the driving time at the treble speed.

Upon completion of the constant speed drive $M_1$ at the treble speed, the integration $I_2$ and the calculation $C_2$ are carried out while performing the lens drive $M_2$ at the tracing speed $S_1$. In the calculation $C_2$, the pulse number $MP_1$, corresponding to the displacement of the moving object on the assumption that the object was moving at the moving speed $S_1$ within the time $T_2$ from the middle point of the previous integration $I_1$, to the middle point of the current integration $I_2$, is obtained by the following formula:

$$MP_1 = T_2 \times S_1$$

Thereafter, the output period $X_2$ of the AF pulses is obtained, based on the time $T_2$ mentioned above, the pulse number $MP_1$, corresponding to the displacement within the time $T_2$, and the defocus pulse number $DP_2$ and then, the tracing speed $S_2$ is obtained by the output period $X_2$ thus obtained:

$$X_2 = T_2/(MP_1 + DP_2) \quad \text{(ms)} \quad \text{④}$$

$$\begin{aligned} S_2 &= 1/X_2 & \text{⑤} \\ &= (MP_1 + DP_2)/T_2 \quad \text{(pulses/ms)}. \end{aligned}$$

Thereafter, the lens drive $M_3$ at the tracing speed $S_2$ is carried out during the subsequent integration $I_3$ and the calculation $C_3$.

Similarly, the pulse number $MP_{n-1}$, corresponding to the displacement of the moving object, on the assumption that the object was moving at the moving speed $S_{n-1}$, within the time $T_n$, is obtained by $(MP_{n-1} = T_n \times S_{n-2})$, and then the lens drives at the tracing speed $S_n$ during the integration $I_{n+1}$ and the calculation $C_{n+1}$.

The in-focus state is maintained for the moving object by the trace control as mentioned above. In the above calculation, the defocus pulse number DP is represented by a scalar value, the sign thereof (minus or plus) for front focus is opposite to the sign (plus or minus) for rear focus. Consequently, if the lens assembly is moved beyond the focal point, the current defocus pulse number $DP_2$ is subtracted from the previous pulse number $DP_1$, corresponding to the displacement of the lens assembly within the time $T_2$.

The formulae in the tracing control discussed above are generally defined by:

$$MP_{n-1} = T_n \times S_{n-2} \quad \text{⑥}$$

(wherein when n=2, $MP_1 = T_2 \times S_1$)

$$X_n = T_n/(MP_{n-1} \pm DP_n) \quad \text{(ms)} \quad \text{⑦}$$

$$S_n = 1/X_n \quad \text{(pulses/ms)} \quad \text{⑧}$$

By the repetitive calculations of the formulae ⑥, ⑦ and ⑧ mentioned above, and the repetitive lens driving operations and integrations based on the calculation results, it is possible to trace the moving object.

Note that in the illustrated embodiment, since the pulse number $MP_{n-1}$ corresponding to the displacement of the object image plane and the defocus pulse number $DP_n$, used in the calculation are represented by absolute values, the sign "±" in formula ⑦ is replaced with "+" for the rear focus, and "−" for the front focus, respectively.

AF Operation When Release Switch is ON:

In general, in the single lens reflex camera, since the mirror is moved up after the release switch is turned ON, it takes a short while before the film is actually exposed after the release switch is actuated. This time will be referred to as a release time lag RTL. In case of a moving object which continues moving during the release time lag RTL, it is desirable to continue the lens driving operation until the shutter is opened after the release switch SWR is turned ON.

To this end, whether or not the release switch SWR is turned ON is checked when the necessary calculations are completed. If the release switch SWR is turned ON, the lens driving operation for the release time lag RTL is performed before the upward movement of the mirror begins. The lens drive includes the DC-drive and the PWM drive (i.e., constant speed drive). In the lens driving operation for the release time lag RTL, the lens assembly is moved at a tracing speed $S_n$ that has been obtained immediately before the release switch SWR is turned ON for the time corresponding to the RTL. Namely, the lens drive $M_{n+1}$ is performed (FIG. 4). As a result of the lens driving prior to the upward movement of the mirror, the in-focus state can be substantially obtained when the first blind of the shutter begins moving (i.e., when the exposure is actually commenced).

Moving Object Tracing Operation in Continuous Photographing Mode (Continuous Releasing):

The moving object tracing operation in the continuous photographing mode will be described below with reference to FIG. 5.

Upon photographing a moving object, the object distance measuring zone may be deviated from the moving object during the tracing thereof. For example, if the moving object is out of the measuring zone and another object far from the moving object is located within the measuring zone, the defocus value would be too large. Consequently, the focusing lens assembly 53 might be moved to the infinite focal position or closest focal position. This would result in an out-of-focus state for the moving object. Furthermore, if the moving object is caught again within the object distance measuring zone, the tracing speed obtained in accordance with the integration data obtained after the moving object is caught again within the object distance measuring zone, or in accordance with the previous integration data is different from the actual speed of the moving object, it takes a long time before the moving object is again in an in-focus state.

A solution thereto will be described below with reference to FIG. 5.

If the release switch SWR is ON when the calculation $C_4$ is completed, the lens drive $M_4$ is carried out to drive the lens assembly by a displacement (i.e., pulse number) corresponding to the release time lag RTL by the DC drive and the PWM drive (i.e., constant speed drive). Thereafter, the upward movement of the mirror is completed, and then the second blind of the shutter is moved to effect the exposure. Thereafter, the winding of the film and the downward movement of the mirror are completed.

When completion of the film winding is detected, the integration $I_5$ is carried out, and the defocus pulse number $DP_5$ is calculated, based on the result of the integration $I_5$. Thereafter, the moving object tracing speed $S_5$ is calculated and the lens assembly is moved at a speed three times the moving object tracing speed $S_5$ for a predetermined time. The tracing speed $S_5$ is obtained by formula ⑤ discussed above. The predetermined time is given by:

$$\{T_{5'} + (I_5/2) + C_5\}/2$$

wherein $T_{5'}$ designates the time from the commencement of the integration to the middle point of the integration $I_5$.

Upon completion of the treble drive $M_5$, the integration $I_6$ and the calculation $C_6$ are carried out to obtain the subsequent tracing speed $S_6$ and the time lag drive pulse number $TDP_6$, while performing the lens drive $M_6$ at the tracing speed $S_5$. Thereafter, the PWM drive of the AF motor 39 is effected through the pulses corresponding to the release time lag.

The integration $I_7$ is executed upon completion of the upward movement of the mirror, the exposure, the downward movement of the mirror, and the winding of the film. In the integration $I_7$, if the moving object is out of the object distance measuring zone, and another object located at an infinite distance is measured, the direction of the defocus would be inverted, and the absolute value thereof would become extremely large. In such case, data obtained in accordance with the integration $I_7$ is invalidated, the tracing speed $S_6$ obtained by the previous integration $I_6$ is used instead to perform the moving object tracing operation. Namely, the lens drive $M_7$ is carried out to drive the lens assembly at a tracing speed three times the tracing speed $S_6$ for the time defined by $\{T_{7'+}(I_7/2)+C_7\}/2$. Thus, the in-focus state can be retained for the moving object.

If the lens drive $M_7$ is completed, the integration $I_8$ and the calculation $C_8$ are carried out similar to the integration $I_6$ and the calculation $C_6$. In the integration $I_8$, if the defocus value is below a predetermined value, the moving object tracing operation is continued based on the defocus value. Conversely, if the defocus value is above a predetermined value, the lens drive $M_8$ is carried out to drive the lens assembly at a tracing speed three times the tracing speed $S_6$ for the time defined by $\{T_{8'+}(I_8/2)+C_8\}/2$, or control is returned to the normal AF operation from the moving object prediction mode. The number of times at which the above operations should be repeated before control is returned to the normal AF operation from the moving object prediction mode can optionally set.

Main Operation:

The main operation of the illustrated embodiment will be discussed below with reference to flow charts shown in FIGS. 6 through 31.

The main operation (i.e., main routine and various subroutines) is generally controlled by the main CPU 35 in accordance with the program prestored in the internal ROM 35a thereof. Data including constants and parameters, etc., necessary to perform the above-mentioned calculations is stored in the memory EEPROM 43.

Figure 6:
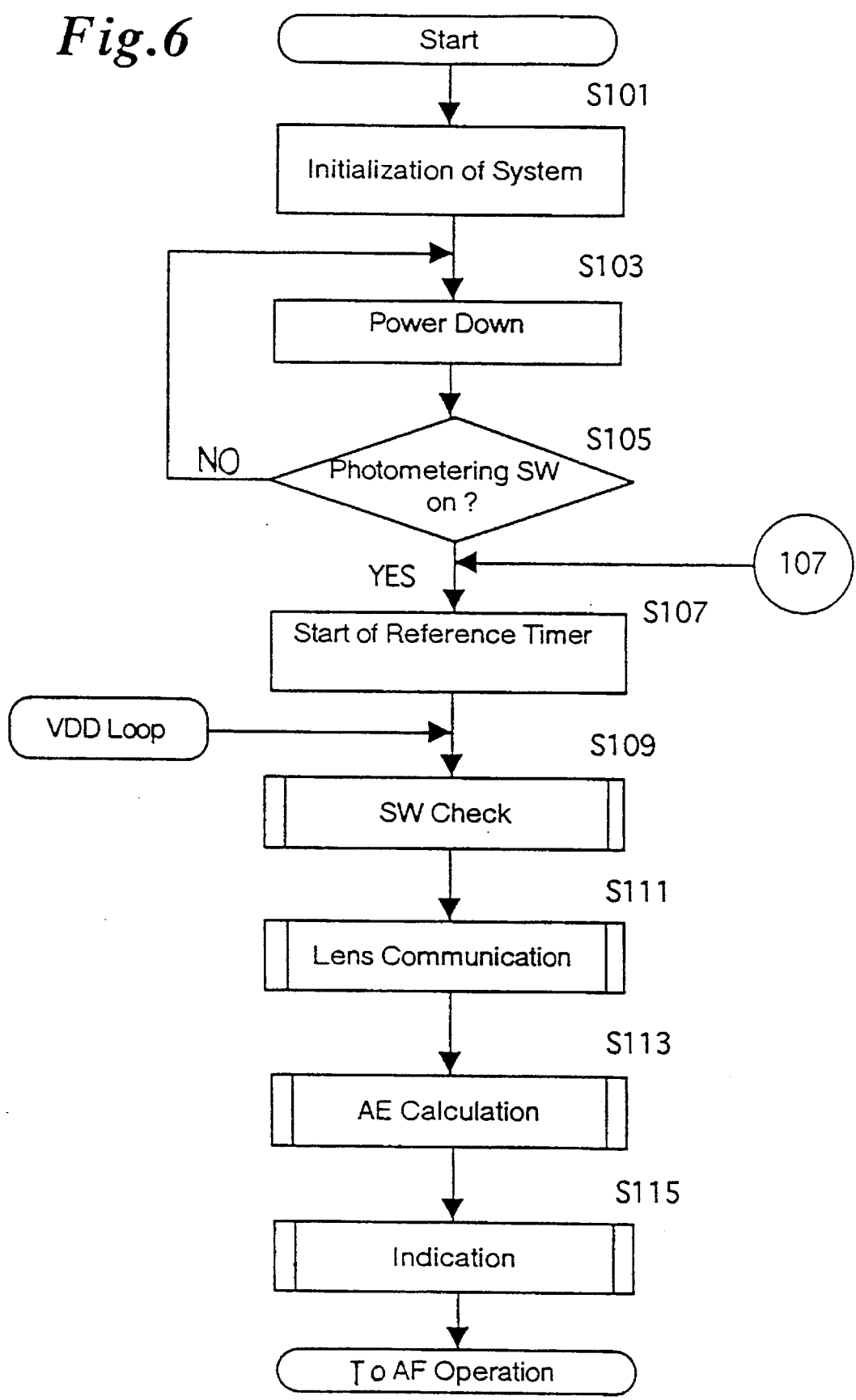
FIG. 6 is a flow chart of a main operation of an automatic focusing device shown in FIG. 1.

FIG. 6 shows a main routine of the main CPU 35. When the main switch SWM is turned ON, control enters the main routine shown in FIG. 6. First, the whole system including input/output ports and memory, etc., is initialized at step S101. Thereafter, the power-down operation is carried out to reduce unnecessary power consumption. Then, whether or not the photometering switch SWS is turned ON is checked. If the photometering switch SWS is not turned ON, control is repeated until the photometering switch SWS is turned ON, while maintaining the power-down state (steps S103 and S105).

If the photometering switch SWS is turned ON, the reference timer 35c is started, and the state of the switches including the AF switch SWAF is checked. Thereafter, the data communication between the lens CPU 61 and the main CPU 35 is performed to input the controllable open diaphragm value, the maximum diaphragm value, the focal length, and the K value, etc., into the main CPU 35 (steps S107, S109, and S111).

Furthermore, the photometric data on the object brightness is input from the photometering IC 17 to calculate the shutter speed and the diaphragm value, in accordance with the input data and the film sensitivity, etc., depending on the selected exposure mode. Thereafter, the calculated shutter speed and the diaphragm value and other photographing data are indicated in the indicator 45 (steps S113 and S115). After that, control proceeds to the AF operation.

Figure 7:
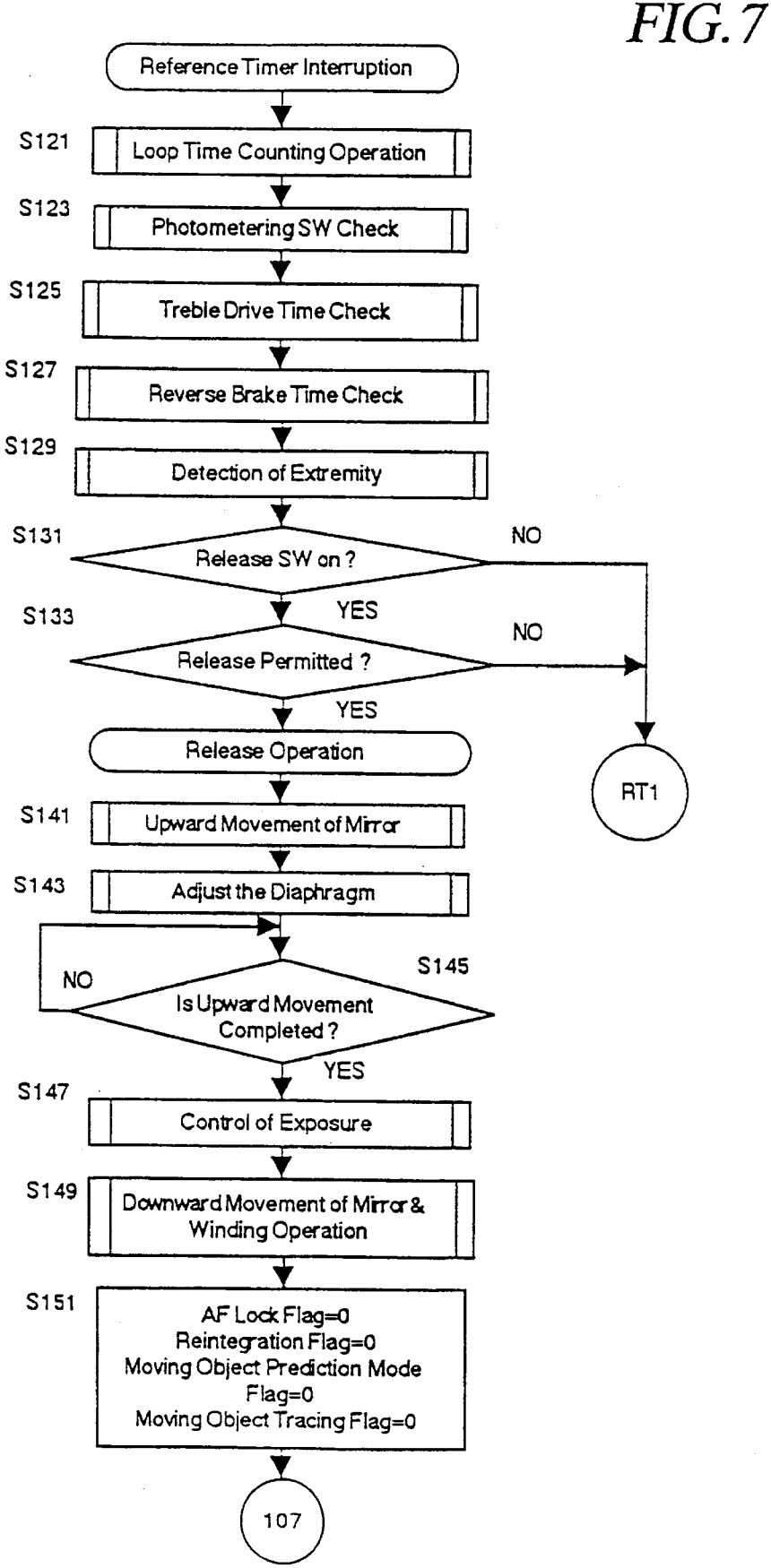
FIG. 7 is a flow chart of a reference timer interruption operation of the automatic focusing device shown in FIG. 1.

In the loop of the main routine shown in FIG. 6, every time the set time of the reference timer 35c has expired, the main routine is interrupted by the reference timer interruption operation shown in FIG. 7. In the reference timer interruption operation, various operations are performed.

In the reference timer interruption operation, the loop time is counted (step S121), and control proceeds to step S123. At step S123, the sub-routine for checking the photometering switch SWS is performed. In this sub-routine, if the photometering switch SWS is turned ON, control is returned. Conversely, if the photometering switch SWS is turned OFF, control enters the main routine shown in FIG. 6.

If the photometering switch SWS is turned ON, the sub-routine for checking the time of the treble drive (steps S125), the sub-routine for checking the brake time (step S127), and the sub-routine for checking whether or not the focusing lens assembly 53 reaches one of the extremities (step S129) are performed.

If the release switch SWR is turned OFF (step S131), or if a release permission signal is not output when the release switch SWR is turned ON, for example, when the in-focus state is not achieved at the focus priority release mode, control is returned to the step at which the main routine is interrupted (step S131).

If the release switch SWR is turned ON and the release permission signal is output, control enters the release operation. In the release operation, the mirror motor 31 is driven to move the mirror up, and the diaphragm mechanism 27 is activated to adjust the diaphragm to the diaphragm value obtained at step S113 (steps S141 and S143).

If the upward movement of the mirror is completed, the shutter mechanism 25 is driven at the shutter speed obtained at step S113 to effect the exposure (steps S145 and S147). Upon completion of exposure, the mirror motor 31 is driven to move the mirror down, and the film winding motor 33 is driven to wind the film by one frame (step S149). Thereafter, the AF lock flag, the reintegration flag, the moving object prediction mode flag, and the moving object tracing flag are cleared. Control is then returned to step S107 (step S151).

AF lock refers to no performance of the AF operation as long as the photometering switch SWS is ON once the in-focus state is obtained. The AF lock flag is set when the in-focus state is obtained.

The reintegration flag indicates that at least one integration is completed after control enters the AF operation. Namely, when at least one integration is completed in the AF operation, the reintegration flag is set.

The moving object prediction mode flag is set when the moving object prediction mode is selected. The moving object tracing flag is set when the tracing operation is being performed in the moving object prediction mode.

Figure 8:
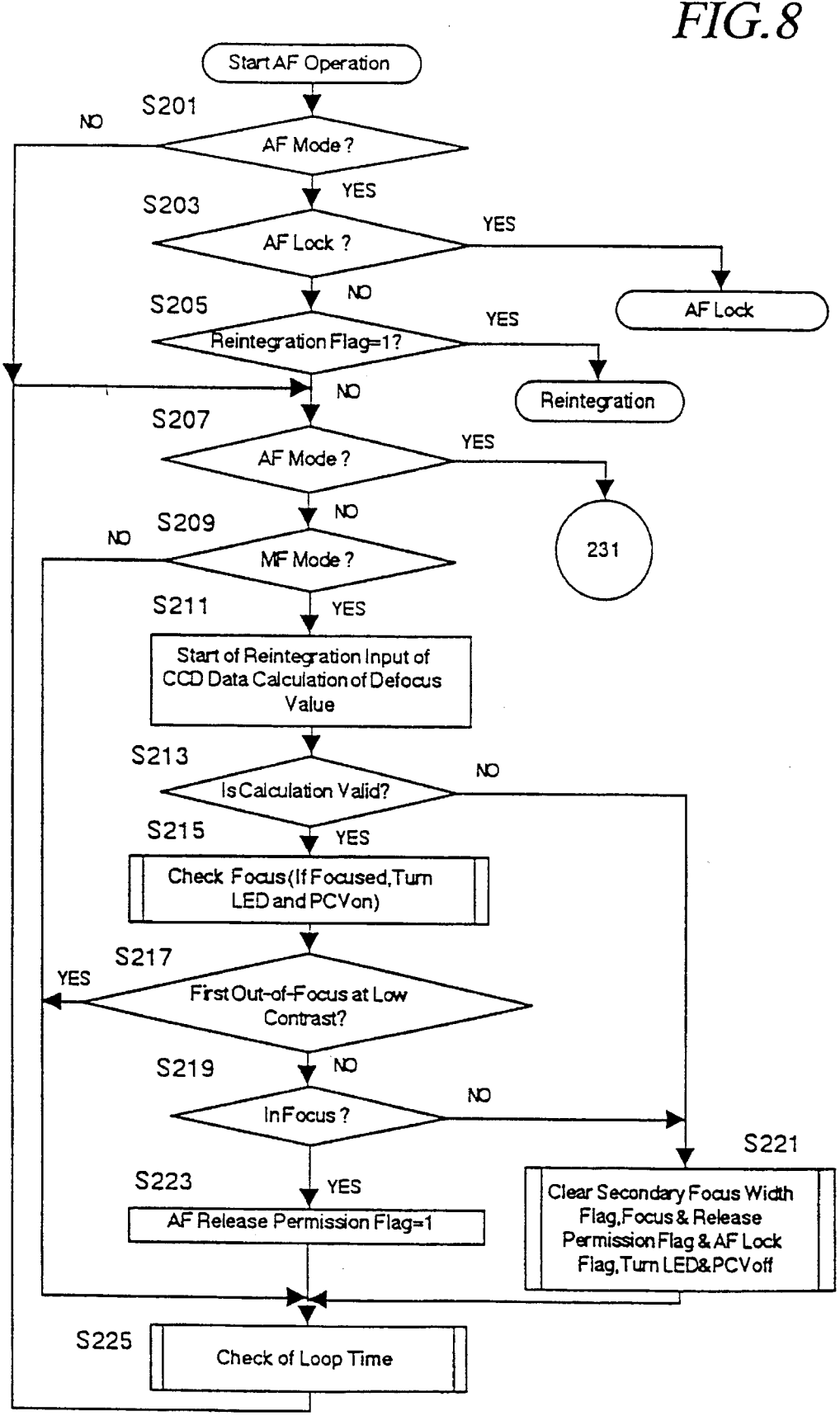
FIG. 8 and 9 are flow charts of an AF start operation of the automatic focusing device shown in FIG. 1.
Figure 9:
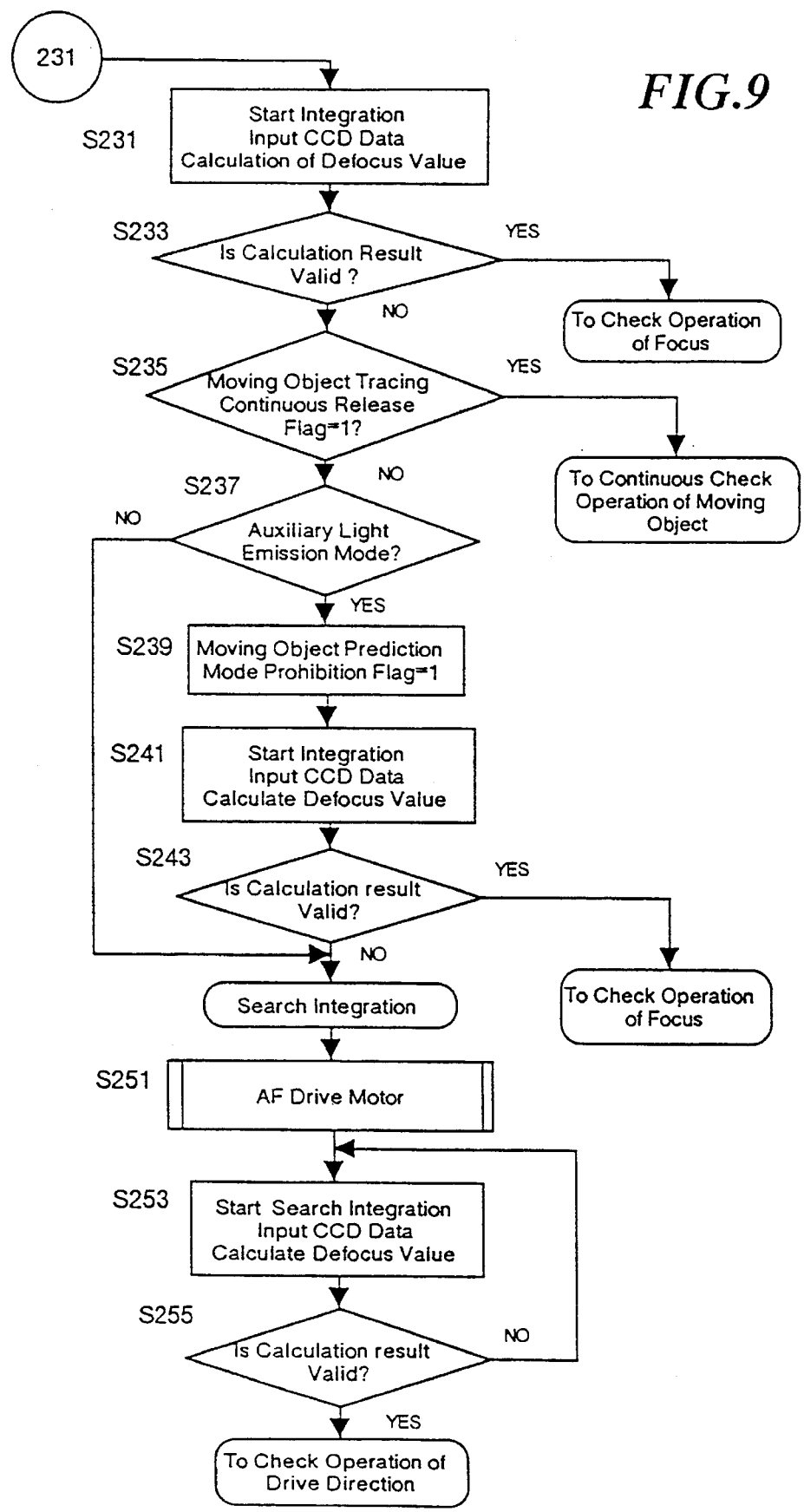

AF Operation:

The AF operation of the illustrated embodiment will be described below, with reference to FIGS. 8 and 9.

Whether the focus mode is the AF mode or MF mode (manual focus) the mode is checked at step S201. If the focus mode is the MF mode, control skips to step S207. Note that the MF mode refers to a manual focus mode in which the focus can be manually adjusted by a photographer.

If the focus mode is the AF mode, whether or not the AF lock flag is set is checked (step S203). If the AF lock flag is "1", control enters the AF lock operation. Conversely, if the AF lock flag is "0", whether or not the reintegration flag is set is checked (step S205). As mentioned above, the reintegration flag is set when the first integration is completed. In the first AF operation, since the reintegration flag is "0", control proceeds to step S207. On the other hand, in the second operation or operation subsequent thereto, the reintegration flag is "1". Accordingly, control enters the reintegration operation.

In the first AF operation, or at the MF mode, whether or not the AF operation is being effected is checked (step S207). If the AF operation is effected, the AF operation starts (step S231). If the AF operation is not effected, whether or not the manual operation is being carried out is checked (step S209). If the manual operation is not being effected, control proceeds to step S225 to perform the loop time checking operation.

Figure 10:
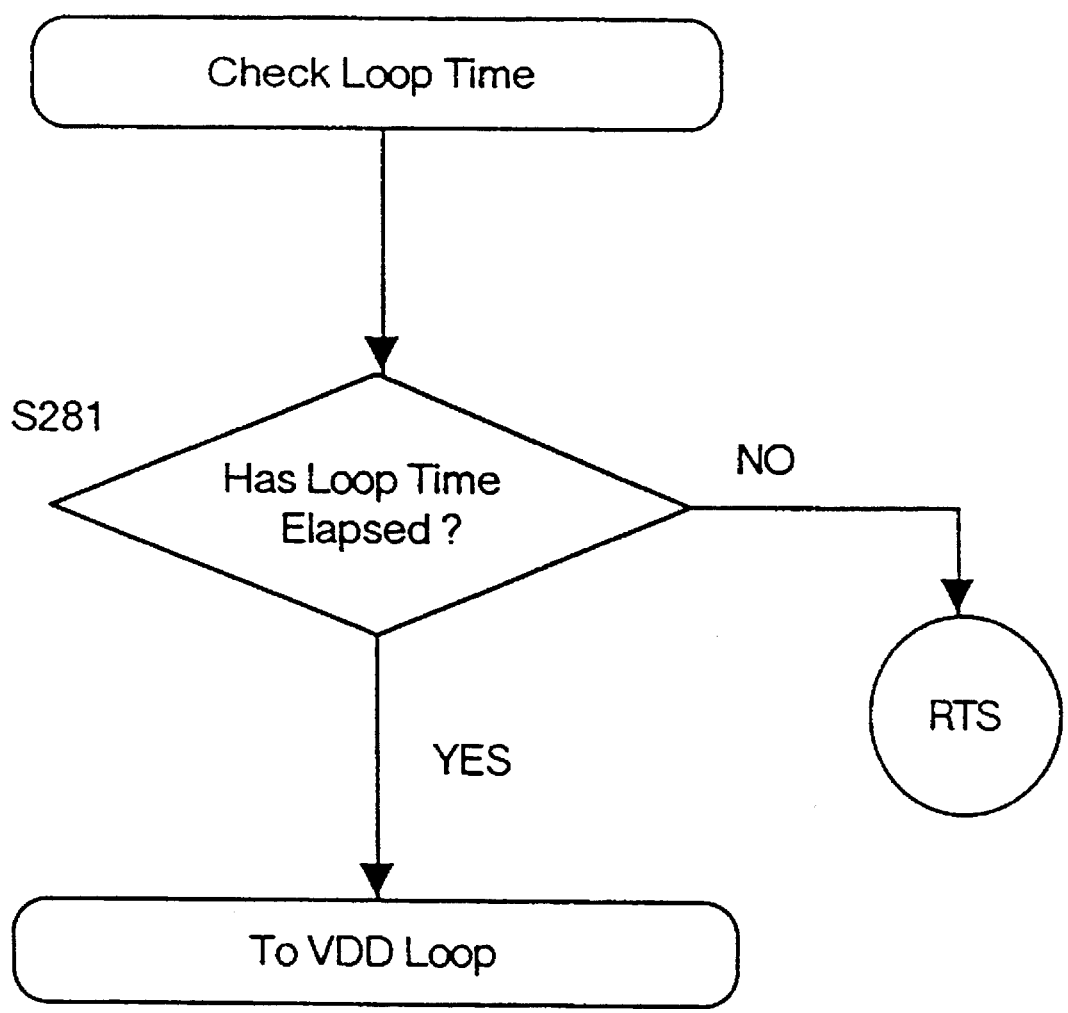
FIG. 10 is a flow chart of a loop time check operation of the automatic focusing device shown in FIG. 1.

In the loop time checking operation shown in FIG. 10, if the loop time has not elapsed, control is returned to step S207 (S281). Conversely, if loop time has elapsed, control is returned to the VDD loop operation.

If the MF operation is being effected, the object distance measuring operation and the focus or defocus indicating operation are carried out (steps S209~S223). At step S211, the integration operation, the integration data (CCD data) input operation and the defocus value calculating operation are performed. Thereafter, whether or not the calculation result is effective is checked at step S213. If the calculation result is effective, and if the image is in focus, the in-focus is indicated by activating the focus indicating LED (not shown) of the indicator 45, and the electronic buzzer 46 is activated. At step 215 it is checked if the object is in focus. If focused, the LED and PCV (i.e., piezo ceramic vibrator) are turned ON.

If the object to be photographed has a low-contrast and the focus condition is determined as being out of focus for the first time, control proceeds to step S225, otherwise control proceeds to step S219. If the object is in focus at step S219, the AF release permission flag is set (step S223), and control proceeds to step S225. Conversely, if the object is out of focus (step S219), a secondary focus width flag is cleared; the focus flag, the release permission flag and the AF lock flag are cleared; the indication of "in-focus" in the indicator 45 is turned OFF; and the electronic buzzer 46 is inactivated (step S221). Thereafter, control proceeds to step S225.

Note that the secondary focus width refers to a focus range in which it is deemed that the object is "in-focus" to prevent a flicker of the "in-focus light" in the vicinity of the focal position.

If the calculation result is invalid (step S213), the control proceeds to step S221 in which the secondary focus width flag, the focus flag, the release permission flag and the AF lock flag are cleared; the indication of "in-focus" in the indicator 45 is turned OFF; and the electronic buzzer 46 is inactivated. Thereafter, control proceeds to step S225.

If control is in the AF operation (step S207), control proceeds to step 231 in which the integration, inputting of the integration data and the defocus value calculation are effected. Thereafter, whether or not the calculation result is valid is checked (step S233). If the calculation result is valid, control proceeds to the focus checking operation. If the calculation result is invalid, whether or not the moving object tracing continuous release flag is set is checked (step S235). If the continuous release flag is set, control proceeds to the continuous checking operation of the moving object. The moving object tracing continuous release refers to continuous photographing operations of the moving object during the tracing thereof. The number of continuous photographing operations is predetermined (not shown). The predetermined number of continuous photographing operations corresponds to the number of releasing operations at out-of-focus during the continuous releasing. It is also possible to manually set the number of continuous photographing operations.

If the moving object tracing continuous release flag is "0" at step S235, whether or not an auxiliary light emission mode is selected is checked (step S237). The auxiliary light emission mode refers to a mode at which auxiliary infrared light (i.e., contrast pattern) is emitted from an auxiliary light emitter (not shown) towards the object to be photographed when the brightness of the object is below a predetermined value.

Since it is difficult or impossible to trace the moving object in the auxiliary light emission mode, the moving object prediction mode prohibition flag is set (step S239). Integration, inputting of integration data and defocus value calculation are effected for the auxiliary light (step S241). Thereafter, whether or not the calculation result is valid is checked (step S243). If the calculation result is valid, control proceeds to the focus checking operation. If the calculation result is invalid, the search integration (steps S251 to S255) is carried out. If the auxiliary light emission mode is not selected, control skips steps S239 through S243 and goes to S251.

In the search integration operation, inputting of the integration data and defocus calculation are performed by the DC-drive of the AF motor 39, since no valid (effective) calculation result has been obtained at step S241 (steps S251 and S253). Thereafter, whether or not the calculation result is valid is checked at step S255. If the calculation result is not valid, the search integration and calculation are performed. If the calculation result is valid, control proceeds to the checking operation of the drive direction.

Figure 11:
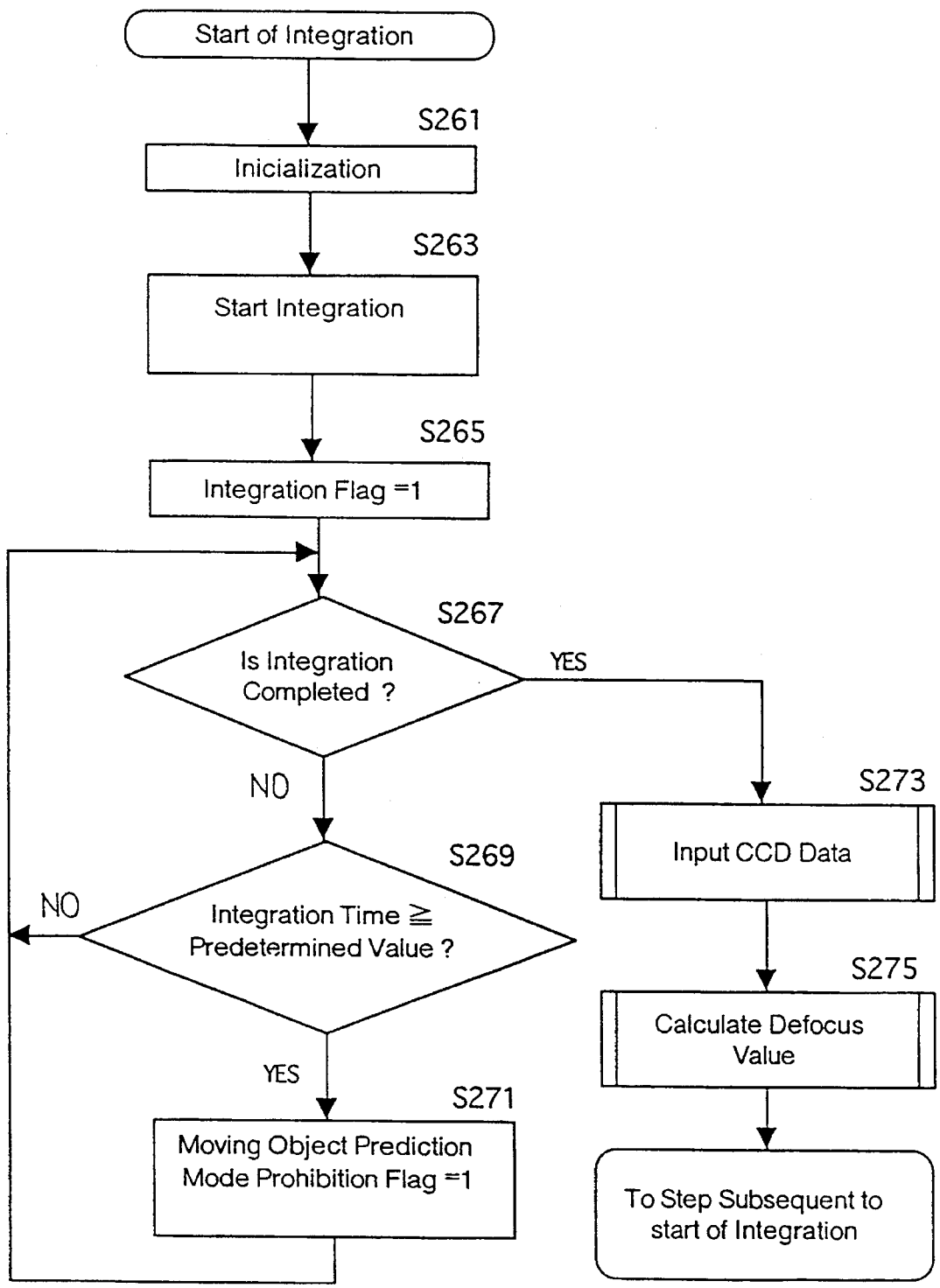
FIG. 11 is a flow chart of an integration start operation of the automatic focusing device shown in FIG. 1.

Integration Starting Operation:

A sub-routine for the integration starting operation shown in FIG. 11 is called by the integration starting operation at step S303 in a sub-routine for the AF starting operation including steps S211, S231, S241 and S303, the search integration starting operation at step S253, or the overlap integration starting operation at step S625. When control enters the integration starting operation, initialization is effected at step S261. Then, the integration (accumulation of the electric charges in the CCD sensor unit 21) is commenced (step S263). Thereafter, the integration flag is set at "1" (step S265). The integration time is checked until a predetermined integration time is over (steps S267 and S269). If integration is not completed within the predetermined integration time, the moving object prediction mode prohibition flag is set at "1", since the object is too dark to perform the moving object prediction operation (step S271). When integration is completed by CCD sensor unit 21 before a predetermined time has lapsed, defocus amount is calculated by inputting integration data (i.e., CCD data), and control is returned to the step subsequent to the start of integration (steps S273 and S275). Thereafter, control is returned to the step at which the integration starts.

Figure 12:
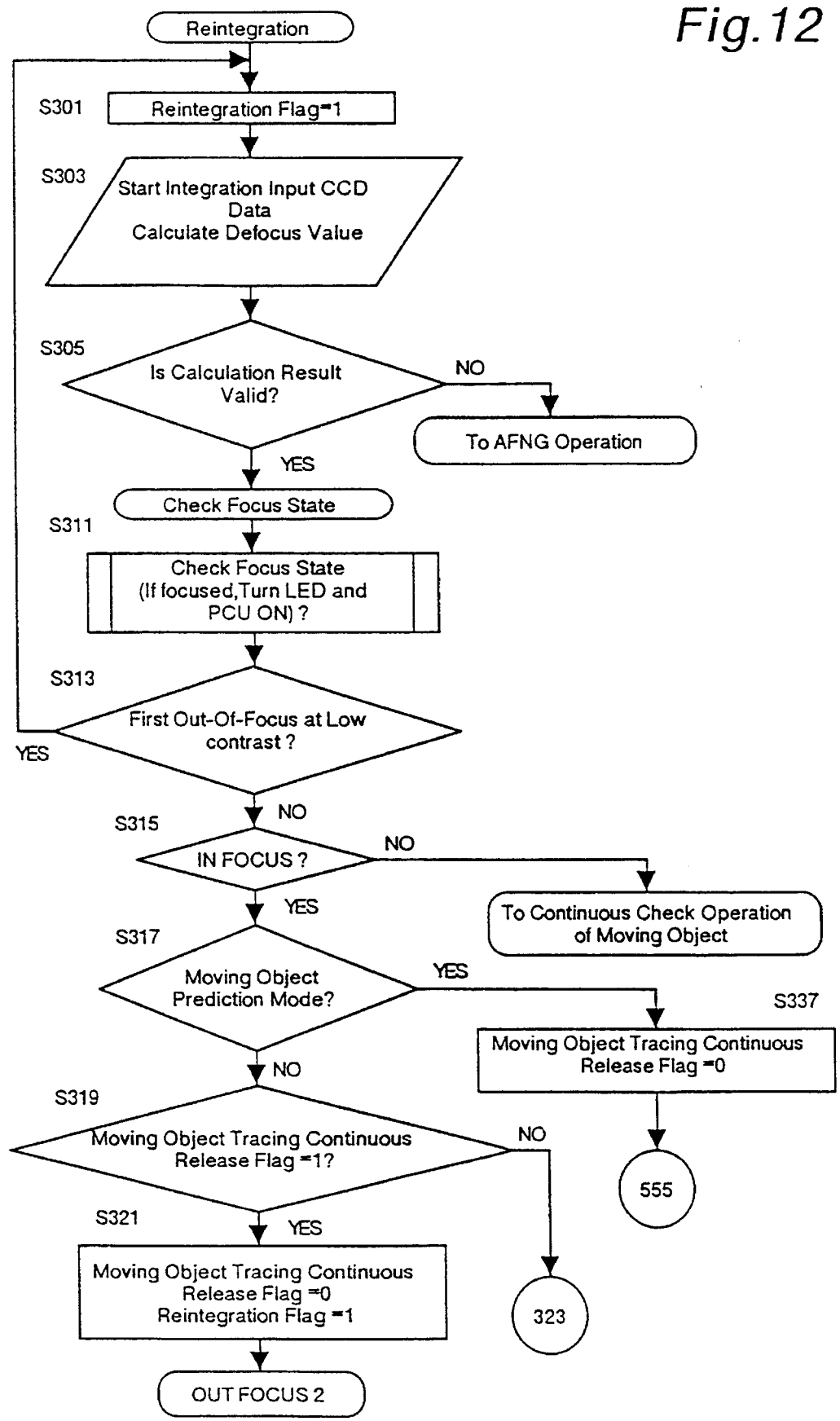
FIGS. 12 and 13 are flow charts of a re-integration operation, a focus check operation and an AF lock operation of the automatic focusing device shown in FIG. 1.
Figure 13:
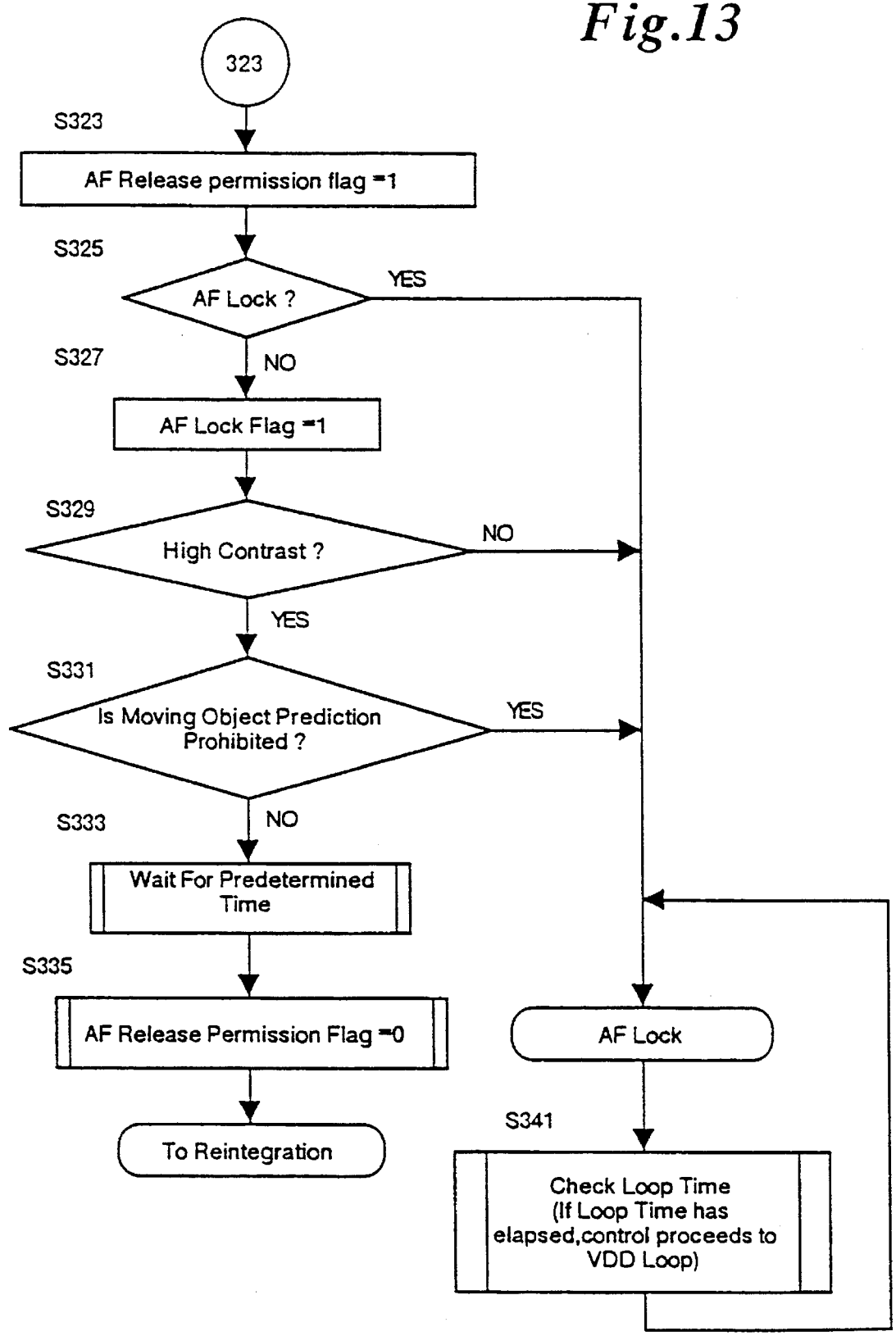

Reintegration and Focus Check:

The reintegration and focus checking operation which starts at step S205, etc., will be discussed below, with reference to FIGS. 12 and 13. The reintegration operation corresponds to a second integration or an integration subsequent thereto, which is performed when the integration starting operation in FIG. 11 is completed after the photometering switch SWS is turned ON.

In the reintegration operation, the reintegration flag is set at "1" to indicate that the integration is a second integration or an integration subsequent thereto (step S301). Thereafter, inputting of the integration data and calculation of the defocus value, etc., are performed (step S303). If the result of the calculation of the defocus value, etc., is invalid, control jumps to the AFNG operation. Conversely, if the calculation result is valid, control proceeds to step S305 to check the focus state. The calculation result of the defocus value could be invalid, for example, when the object is too dark, or the object is a wall of uniform brightness.

In the focus state checking operation, the focus state is checked, based on the defocus value. If the object is in focus, the LED of the indicator 45 and the PCV (Piezo ceramic Vibrator) (electronic buzzer) 46 are activated to indicate the "in-focus" state (step S311). If the object is out of focus, no operation is performed.

If the object to be photographed has a low contrast and the focus condition is determined to be out-of-focus for the first time, control returns to step S301, otherwise control proceeds to step S315. At step S315, if an "in-focus" condition is determined, control proceeds to step S317. If the moving object prediction mode is selected, the moving object tracing continuous release flag is cleared and control proceeds to step S555. If the moving object prediction mode is not selected, and the moving object tracing continuous release flag has been set at "1", the moving object tracing continuous release flag is cleared and the reintegration flag is set at "1". Thereafter, control proceeds to the out-of-focus 2 operation (step S503 in the out of focus operation) shown in FIG. 17 (steps S317 through S321).

If the moving object prediction mode is not selected, and the moving object tracing continuous release flag is set at "0", the AF release permission flag is set and whether or not the AF lock flag is set is checked (steps S317, S319, S323 and S325).

If the AF lock flag has not been set at "1" (step S325), the AF lock flag is set (step S327). If the AF lock flag has been set at "1" (step S325), which means that the operation is a second operation after the in-focus state has been obtained, control skips to step S341 of the AF lock operation to call the sub-routine for the loop time checking operation.

If the AF lock flag is set at step S327, whether or not the object contrast is high is checked (step S329). If the object contrast is high, whether or not the moving object prediction mode prohibition flag is set is checked (step S331). If the moving object prediction mode prohibition flag is not set, control waits for the interruption by the release operation for a predetermined time (step S333). If there is an interruption by the release operation within a predetermined time, the release operation is performed. Conversely, if there is no interruption by the release operation within a predetermined time, the AF release permission flag is cleared to prohibit the releasing operation, and control is returned to step S301 (steps S329 through S335).

If the object contrast is low, or the moving object prediction mode prohibition flag is set, control proceeds to the AF lock operation (step S341). Note that the "AF lock" refers to no execution of the AF operation so long as the photometering switch SWS is ON after the in-focus state is obtained.

Figure 14:
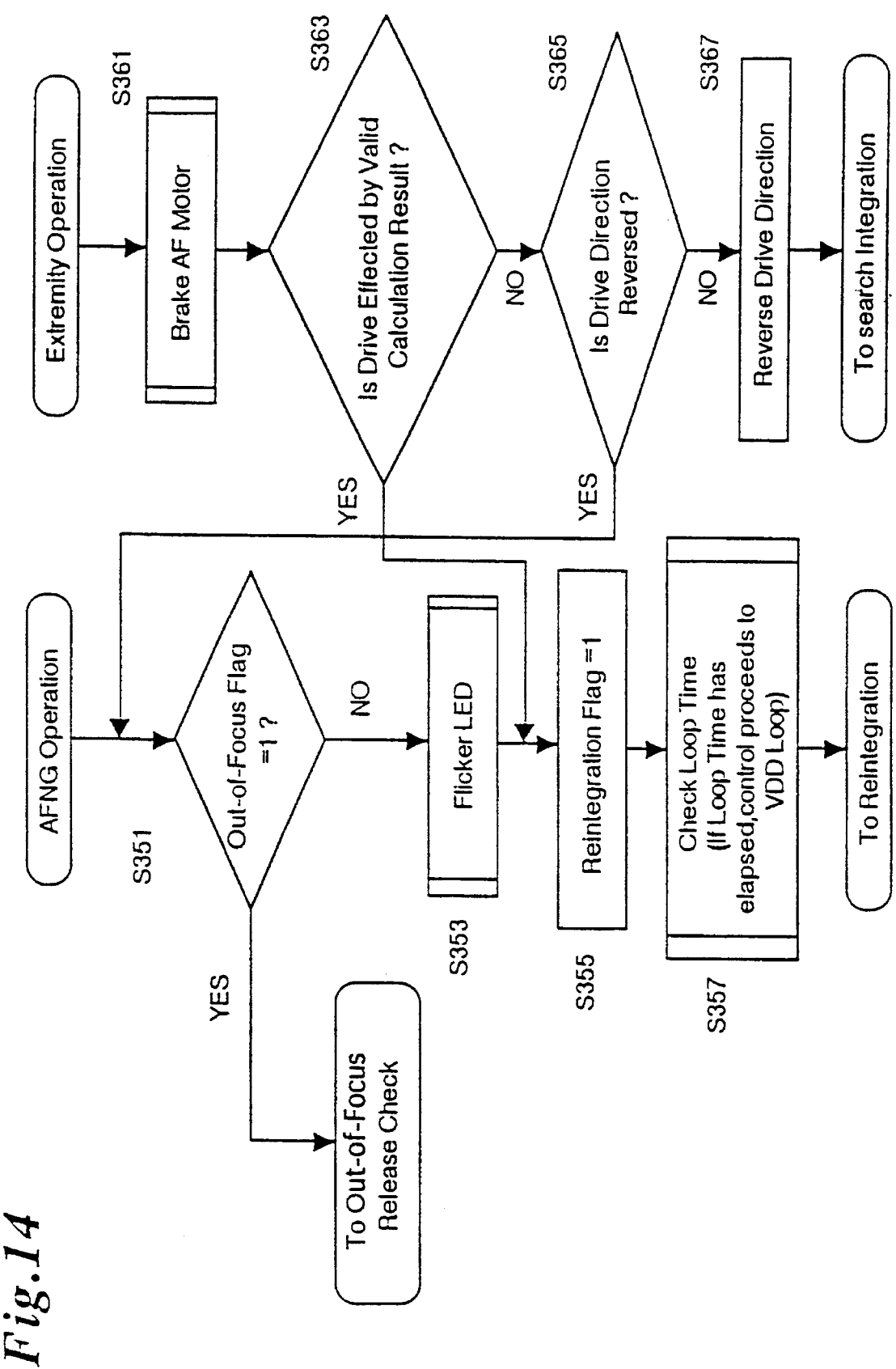
FIG. 14 is a flow chart of an AFNG operation and a terminal point operation of the focusing device shown in FIG. 1.

AFNG Operation and Extremity Operation:

The AFNG operation, which is performed when the calculation result is determined to be invalid, will be described below with reference to a sub-routine shown in FIG. 14.

In this sub-routine, whether or not the moving object tracing out-of-focus flag is set (i.e., whether or not the object is out of focus when the moving object is traced) is checked (step S351). If the out-of-focus flag is set, the releasing operation can be effected. Accordingly, control proceeds to the out-of-focus release checking operation. If the out-of-focus flag is reset to "0", the focusing LED is flickered to indicate the out-of-focus (step S353). Since the integration continues, the reintegration flag is set at "1" (step S355), and the loop time checking sub-routine is called. If the loop time reaches a predetermined time, control is returned to step S109 (step S357). Conversely, if the loop time does not reach a predetermined time, control proceeds to the reintegration operation.

Extremity Operation:

If the focusing lens assembly 53 reaches one of the extremities, at which no further movement thereof occurs, or if an external force is applied to the AF motor 39 so that no further rotation thereof takes place, the AF motor 39 is braked (step S361). If the AF motor 39 has been driven in accordance with the valid calculation result, control proceeds to step S355 (step S363). Conversely, if the AF motor 39 has been driven in accordance with the invalid calculation (for example, during the search integration), the drive direction is checked (step S365). If the drive direction is a reverse direction, control proceeds to step S351, and if the drive direction is a forward direction, the drive direction is reversed (step S367). Control then proceeds to the search integration operation.

Figure 15:
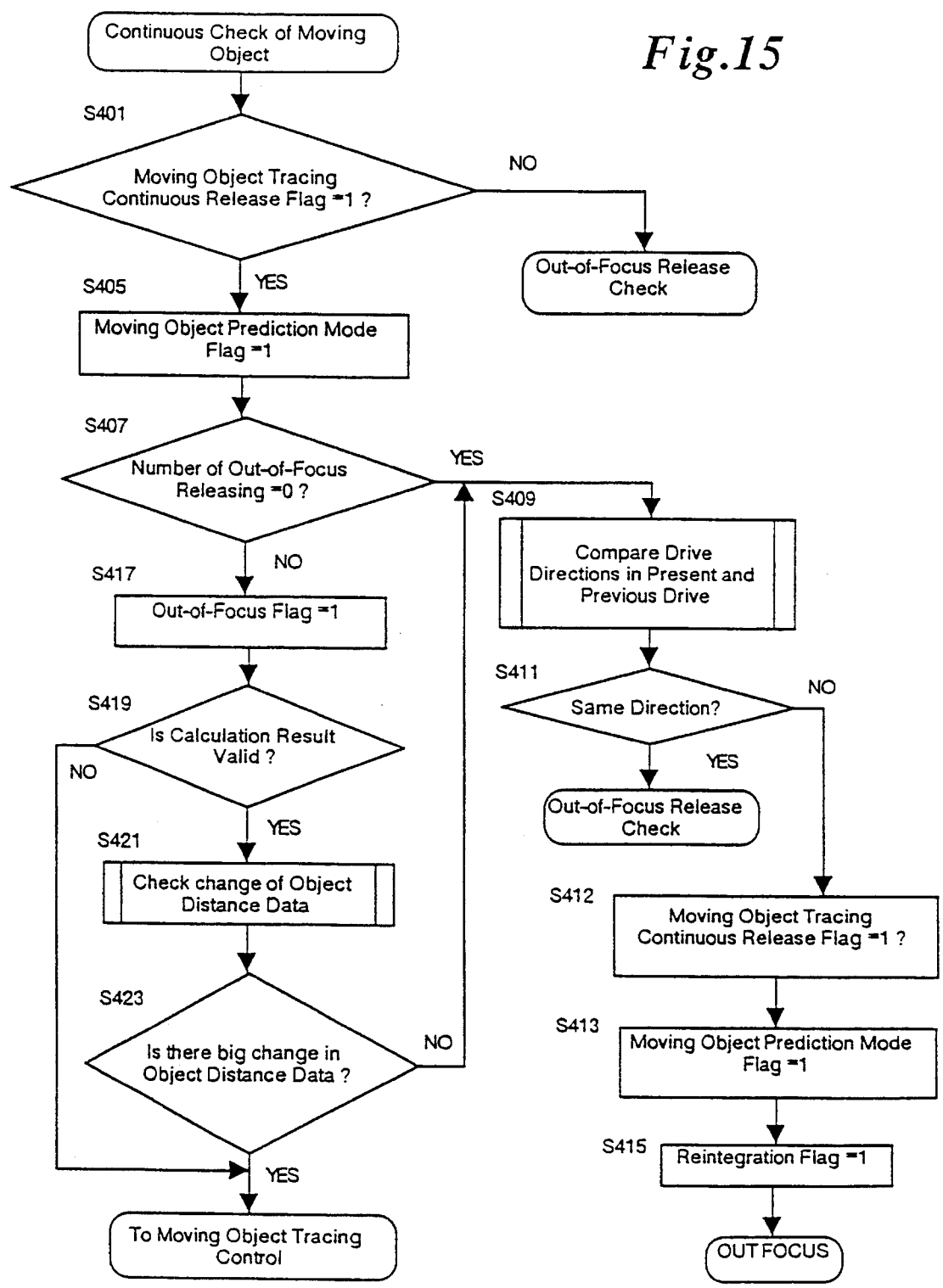
FIG. 15 is a flow chart of a moving object continuous check operation of the automatic focusing device shown in FIG. 1.

Moving Object Continuous Check Operation:

FIG. 15 shows a sub-routine for the moving object continuous check operation. Control enters this sub-routine, for example, if the out-of-focus is detected at step S315 of the focus checking sub-routine.

In this sub-routine, whether or not the moving object tracing continuous release flag is set is checked at step S401. If the operation is a first, second or third operation at the most, reckoned from the commencement of the AF operation, the moving object tracing continuous release flag is not set. Accordingly, control skips to the out-of-focus release check operation shown in FIG. 16, without carrying out the moving object tracing continuous check operation.

If the moving object tracing continuous release flag is set, the following operation is performed, since the moving object is being traced in the continuous photographing operation. First, the moving object prediction mode flag is set at "1". Then, whether the number (referred to as the moving object continuous release number) of releasing operations at the out-of-focus during the moving object tracing continuous releasing is 0 is checked (steps 405 and S407).

If the number of moving object continuous releasing is 0, the releasing at the out-of-focus is completed, and accordingly, the drive direction of the lens assembly in the previous driving operation is compared with the driving direction in the present driving operation. If the directions are identical, control jumps to the out-of-focus release operation (steps S407, S409 and S411). Conversely, if the directions are different from each other, i.e., if the direction of movement of the moving object tracing varies, the moving object continuous release flag is reset at "0"; the moving object prediction mode is reset at "0"; and the reintegration flag is set at "1". Thereafter, control skips to the out-of-focus operation shown in FIG. 17 (steps S409, S411, S412, S413 and S415).

If the number of moving object continuous releasing is not 0, which means that the release can be performed, the out-of focus flag at the continuous releasing is set at "1". Then, whether or not the calculation result of the object distance is valid is checked (steps S407, S417 and S419). If the calculation result is valid, whether or not there is a large difference in the object distance data between the previous measurement and the present measurement is checked (steps S421 and S423). If there is a large change in the object distance, control skips to the moving object trace control operation (step S561). If there is no large change, control skips to step S409 (steps S419 through S423 or S419 through S423 and S559). If the calculation result of the object distance is invalid, the control directly jumps to step S561 to perform the moving object trace control operation (steps S419 and S559).

Figure 16:
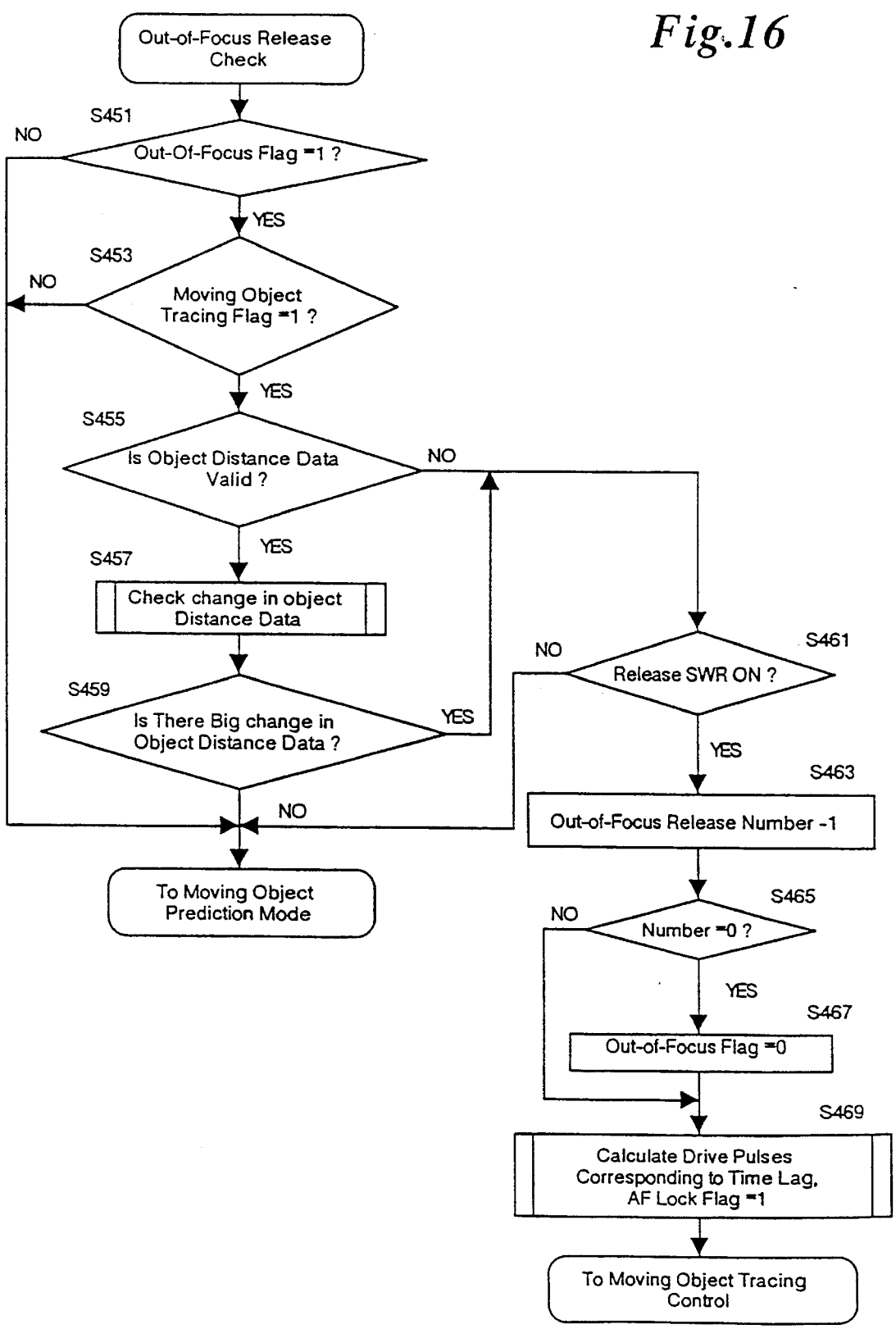
FIG. 16 is a flow chart of an OUT FOCUS release check operation of the automatic focusing device shown in FIG. 1.

Out-of-Focus Release Check:

The out-of-focus release check will be discussed below with reference to a sub-routine shown in FIG. 16. In this operation, releasing is prohibited if the object is out of focus in the focus priority AF operation mode, but the release can be effected in the moving object prediction mode even if the object is out of focus and there is a large change in the defocus value.

Whether or not the out-of-focus flag is set at "1" and whether or not the moving object tracing flag is set at "1" both are checked at steps S451 and S453. If either the out-of-focus flag or the moving object tracing flag is not set at "1", then, control proceeds to the moving object prediction mode operation. If both the out-of-focus flag and the moving object tracing flag are set at "1", whether or not the calculation result of the object distance is valid is checked (step S455). If the calculation result is valid, the change of the object distance data (i.e., pulse number corresponding to the defocus value) is checked. If there is no great change in the object distance data, control proceeds to the moving object prediction mode operation (steps S451 through S459).

If the calculation result of the object distance is invalid, or if there is a change, greater than a predeterminal threshold level in the object distance data, even if the calculation result of the object distance is valid, the release switch SWR is checked (steps S455, S461 or S455 through S461). If the release switch SWR is not turned ON, control proceeds to the moving object prediction mode operation. If the release switch SWR is turned ON, the moving object continuous release number is reduced by one decrement. Consequently, if the moving object continuous release number becomes 0, the moving object continuous out-of-focus flag is cleared. Then, the pulse number corresponding to the time lag is calculated. Thereafter, the AF lock flag is set at "1" to perform the moving object tracing control. Conversely, if the moving object continuous release number is still not 0, the pulse number corresponding to the time lag is calculated without clearing the moving object continuous out-of-focus flag. Thereafter, the AF lock flag is set at "1" to perform the moving object tracing control (steps S465 through S469 or S465 and S469).

Figure 17:
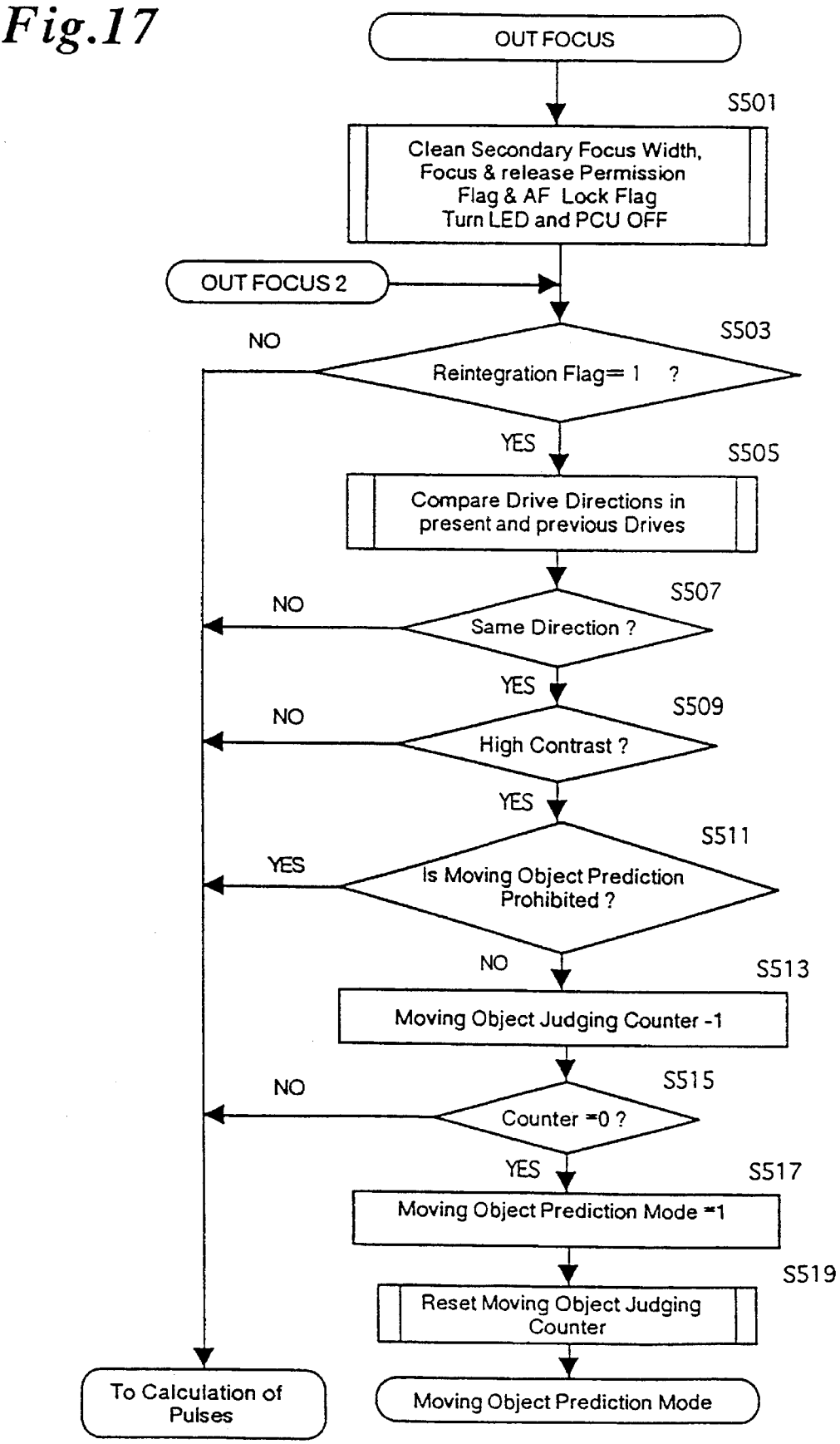
FIG. 17 is a flow chart of an OUT FOCUS operation of the automatic focusing device shown in FIG. 1.

Out-of-Focus Operation:

The out-of-focus operation (i.e., operation when the object is out of focus) will be explained below with reference to a subroutine shown in FIG. 17.

In the out-of-focus operation, if there are more than two consecutive out-of-focus states for the moving object, control enters the moving object prediction mode operation.

First, the secondary focus width flag is cleared; the in-focus flag, the release permission flag and the AF lock flag are cleared; and, the in-focus indicating LED of the indicator 45 and the electronic buzzer 46 are inactivated (step S501).

Thereafter, whether or not the reintegration flag is set is checked (step S503). If the reintegration flag is not set at "1", which means that the operation (integration) is the first operation (integration), control jumps to the pulse number calculating operation. Conversely, if the reintegration flag is set at "1", which means that at least one operation (first integration) has been completed, the direction (drive direction) of the movement of the lens assembly by the previous driving operation is compared with the direction (drive direction) of movement of the lens assembly by the present driving operation (steps S505 and S507). If the driving directions are identical, whether or not the object contrast is high is checked (step S509). If the object contrast is high, control proceeds to step S511 to check whether or not the moving object prediction prohibition flag is set at "1". If the moving object prediction prohibition flag is set at "0", the number of the moving object judging counter is reduced by one decrement (step S513). Note that the initial value of the counter is set at "3". Namely, if three consecutive out-of-focus states occur as a result of the reintegration and movement of the lens assembly, the object is determined to be a moving object.

If the reintegration is cleared, the drive directions are different. If the contrast of the object is not high, or the moving object prediction prohibition flag is set at "1", control proceeds to the pulse number calculating operation without performing the counting operation of the number of the occurrence of the out-of-focus state (steps S503, S507, S509 and S511).

After the number of the moving object judging counter is reduced, whether the number of the counter is "0" is checked at step S515. If the number is "0", the moving object prediction mode flag is set at "1", and the counter is reset to "3" in the illustrated embodiment at steps S517 and S519. If the counter number is not "0" at step S515, control proceeds to the pulse number calculating operation.

Figure 18:
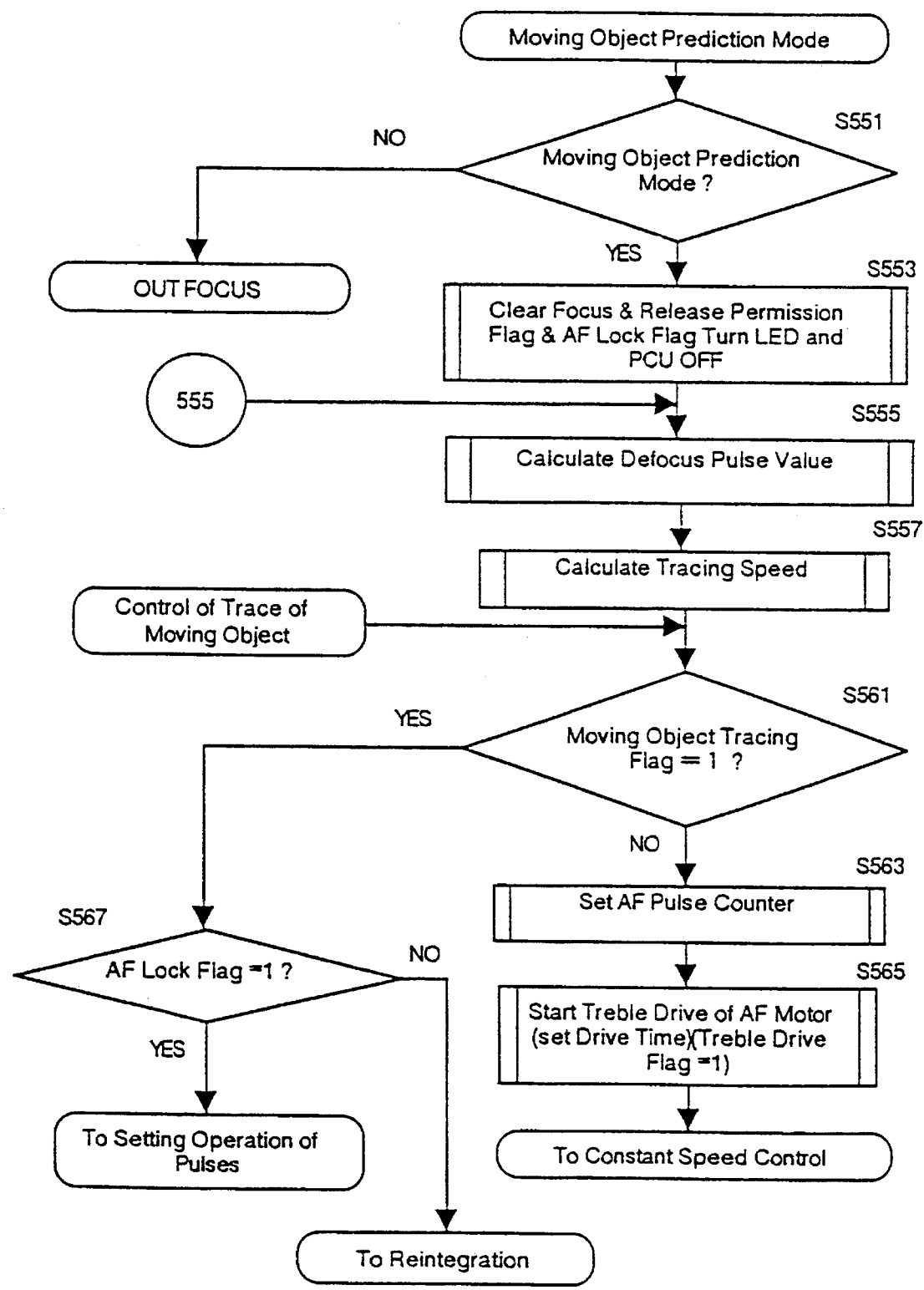
FIG. 18 is a flow chart of a moving object prediction mode operation and a moving object trace controlling operation of the automatic focusing device shown in FIG. 1.

Moving Object Prediction Mode Operation:

The moving object prediction mode operation will be discussed below with reference to a sub-routine shown in FIG. 18. In this sub-routine, whether or not the moving object prediction mode flag is set at "1" is checked (step S551). If moving object prediction mode flag is not set, which means that the out-of-focus state has occurred once or twice, control proceeds to the out-of-focus operation mentioned above. If the moving object prediction mode flag is set, the in-focus flag, the release permission flag and the AF lock flag are cleared, and the LED of the indicator 45 and the buzzer 46 are inactivated (steps S551 and S553).

Thereafter, the defocus pulse number is calculated in accordance with the latest integration result at step S303 (step S555). The defocus pulse number is for the object at the middle point of the integration time.

The speed of the movement of the object image plane (i.e., moving object tracing speed) is calculated in accordance with the present defocus pulse number and the time between the middle points of the previous and present integration times (step S557). Upon completion of the calculation, whether or not the moving object tracing flag is set is checked (step S561).

If the moving object flag is set, which means that the object is being traced, whether or not the AF lock flag is set is checked (step S567). If the AF lock flag is set to "1", control proceeds to the pulse set operation and if the AF lock flag is not set at "1", control proceeds to the reintegration operation to perform the reintegration (steps S559, S565).

If the moving object flag is not set, the defocus pulse number calculated at step S555 is set in the AF counter 35d so as to drive the lens assembly for the first time. Thereafter, the drive time, in which the AF motor 39 and, accordingly, the focusing lens assembly 53 are driven at a speed three times the moving speed of the object, is set, and the treble speed drive flag is set (steps S559 through S563). Thereafter, control proceeds to the constant speed control operation.

Figure 19:
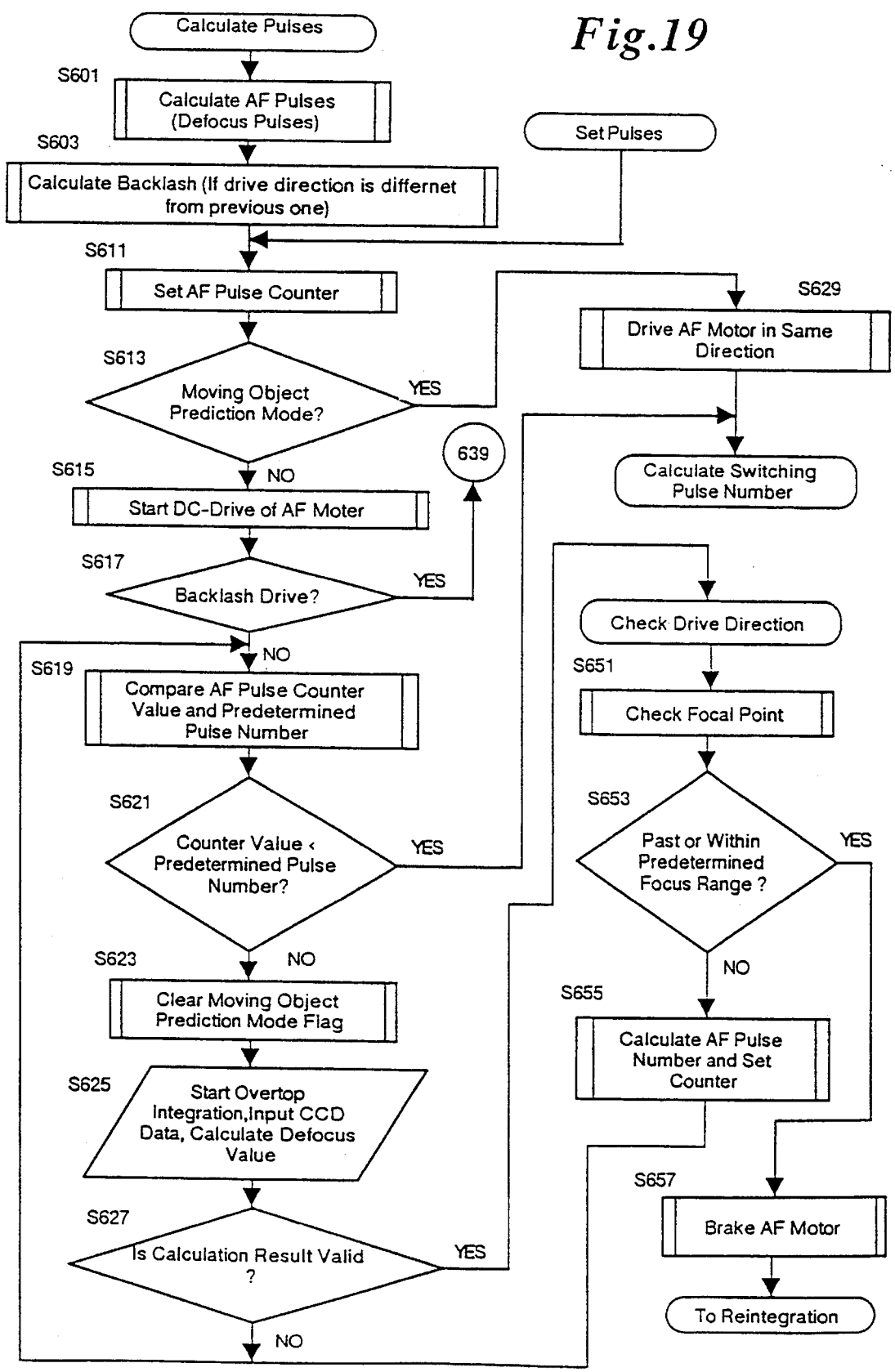
FIGS. 19 and 20 are flow charts of a pulse calculating operation and a pulse setting operation of the automatic focusing device shown in FIG. 1.
Figure 20:
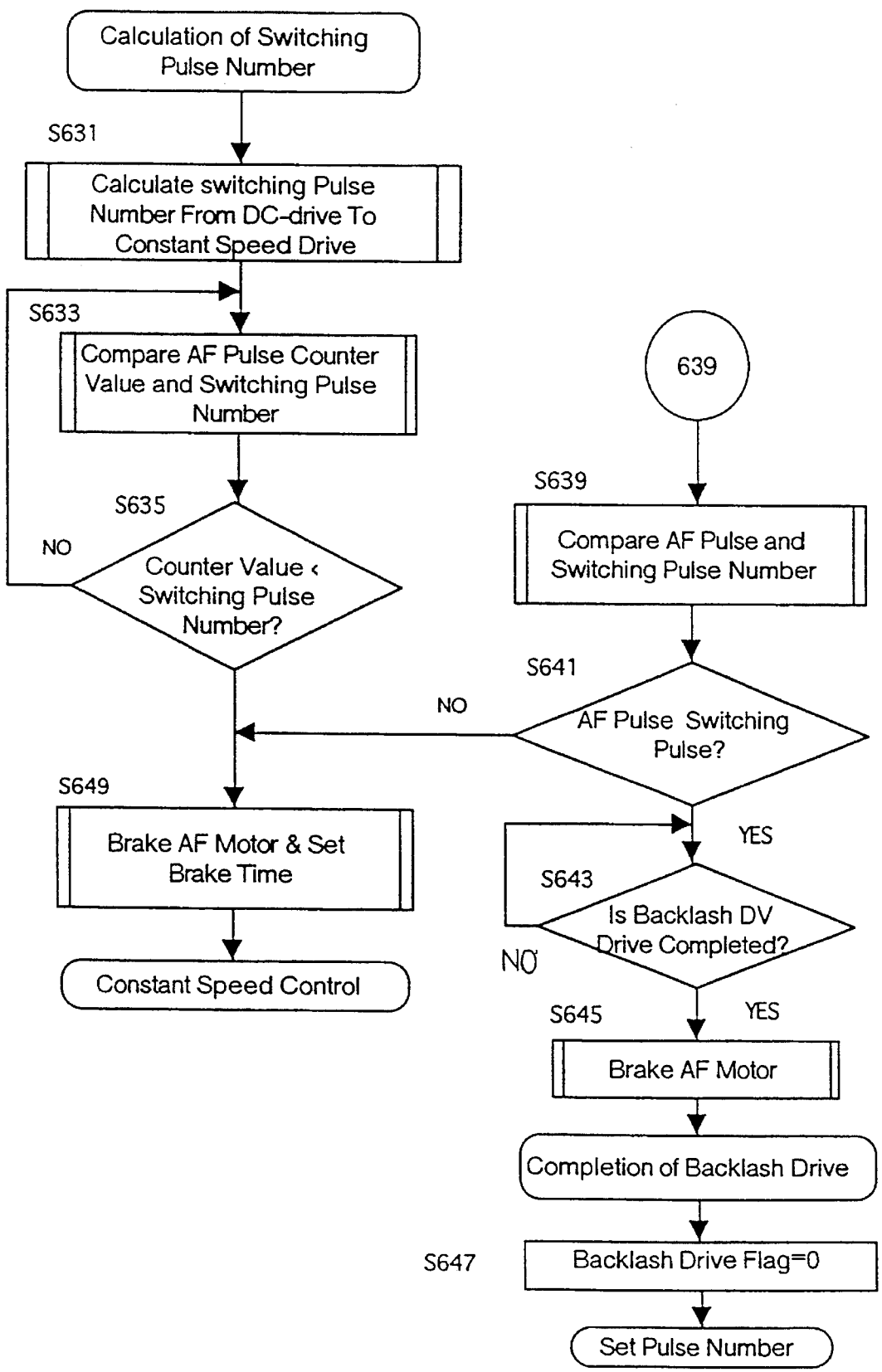

Pulse Calculating Operation:

The pulse calculating operation will be discussed below with reference to FIGS. 19 and 20. In the pulse calculating operation, the pulse number necessary to move the focusing lens assembly 53 to a focal position in accordance with the defocus value is determined based on the integration data and the pulse number necessary to eliminate the backlash (backlash drive).

Note that the backlash drive refers to a driving operation to eliminate the backlash of the internal gears of the AF motor 39, the joints 47 and 57, and the lens driving mechanism 55, etc., that could occur, for example, when the rotational direction of the AF motor 39 is reversed. In the illustrated embodiment, the backlash drive is independently carried out prior to the driving of the lens assembly in accordance with the defocus value.

In the pulse calculation, the defocus pulse number is calculated at step S601. Thereafter, the backlash pulse number is calculated if the drive direction is changed (i.e., the sign of the defocus value is changed) at step S603. Thereafter, the backlash drive flag is set and control proceeds to the pulse set operation. The backlash pulse number refers to the direction and number of pulses necessary to eliminate the backlash. The degree of the backlash of the camera body 11 is prestored in the memory EEPROM 43. The degree of backlash of the taking lens 51 is prestored in the ROM of the lens CPU 61 and is input and stored in the RAM 35b of the main CPU 35 of the camera body by the data communication between the taking lens and the camera body through the peripheral control circuit 23.

In the pulse set operation, if the backlash drive flag is not set, the defocus pulse number is set in the counter 35d as the AF pulse number. If the backlash drive flag is set, the backlash pulse number is set in the counter 35d as the AF pulse number. Thereafter, whether or not the moving object prediction mode flag is set is checked.

If the moving object prediction mode is not selected, the DC drive of the AF motor 39 is commenced (step S613 and S615). If the backlash drive flag is cleared, the counted value of the counter 35d is compared with a predetermined reference pulse number. If the counted value of the counter 35d is below the reference pulse number, the control proceeds to step S631 (i.e., switching pulse calculating operation). Conversely, if the counted value of the counter 35d is greater than or equal to the reference pulse number, the moving object prediction mode flag is cleared, and the overlap integration is commenced; the CCD data is input; and the defocus calculation is commenced (steps S617 through S625). The overlap integration refers to an integration with the drive of the focusing lens assembly.

When the defocus value is determined, whether or not the calculation result (defocus value) is valid is checked (step S627). If the defocus value is invalid, control is returned to step S619, and if the defocus value is valid, control proceeds to the drive, direction checking operation (steps S651 through S657).

In the drive direction checking operation, whether the focal point is located closer to the image plane than a predetermined range, based on the defocus value (steps S651 and S653), is checked. The predetermined range is wider than the focus range (focus width) for judging the in-focus state. If the focal point is located closer to the image plane than the predetermined range, the defocus pulse number is calculated based on the defocus value obtained by the overlap integration at step S625 and is set in the counter 35d (steps S653 and S655). Thereafter, control is returned to step S619. Conversely, if the focal point is located beyond (farther than) or within the predetermined range, the short brake (i.e., short circuit) is applied to the AF motor 39 to stop the lens drive. Then, control is returned to the reintegration operation (steps S653 and S657). Note that the short brake of the AF motor 39 refers to a brake by a short-circuit of the input terminal of the AF motor 39 in the illustrated embodiment.

If the moving object prediction mode is selected (i.e., if the moving object prediction mode flag is set), the AF motor 39 is rotated in the same direction by the DC drive (step S629). Thereafter, the pulse number for switching the drive of the AF motor 39 from the DC drive to the constant speed drive by the PWM control is calculated at step S631. Thereafter, the AF pulse number (value of the counter 35d) is compared with the constant speed switching pulse number (step S633). Control is repeated until the AF pulse number is below the constant speed switching pulse number (step S635).

If the AF pulse number is below the constant speed switching pulse number, the AF motor 39 is subject to a reverse brake and the reverse brake time is set (step S649). Thereafter, control proceeds to the constant speed control operation.

The reverse brake referred to above means the reversing of electric current supplied to the AF motor to supply a rotational force to the AF motor in a direction opposite to the direction in which the AF motor has been rotated. The reverse brake time refers to an interval of the AF pulses output from the encoder 41. The pulse interval increases as the rotational speed of the AF motor 39 decreases. Namely, in the illustrated embodiment, the reverse brake is applied to the AF motor 39 until the AF pulse interval is longer than the reverse brake time. Accordingly, the inertia of the AF motor by the DC drive is reduced or cancelled by the reverse brake, so that a predetermined constant speed of the AF motor can be obtained within an extremely short period of time.

If the backlash drive flag is set at step S617, the AF pulse number is compared with the constant speed switching pulse number (step S639). If the AF pulse number is below the constant speed switching pulse number, the AF motor 39 is subject to a reverse brake and the reverse brake time is set. Thereafter, control proceeds to the constant speed control operation. (steps S639, S641 and S649).

If the AF pulse number is above the constant speed switching pulse number, whether or not the backlash drive is completed is checked at step S643. Control is repeated until the backlash drive is completed. If the backlash drive is completed, the AF motor 39 is braked to stop the AF motor 39. Thereafter, the backlash drive flag is cleared to indicate the completion of the backlash drive, and control is returned to the pulse set operation (steps S641 through S647). Thereafter, the defocus pulse number is set in the AF pulse counter to drive the lens assembly for the normal AF operation.

Thus, the backlash drive is performed prior to the drive for correcting the defocus. If the displacement corresponding to the defocus pulse is above a predetermined value, the backlash drive is carried out by the DC drive within an extremely short space of time. If the displacement corresponding to the defocus pulse is below a predetermined value, the focusing lens assembly is precisely moved by a displacement corresponding to the defocus pulse at a constant speed.

Calculation of Pulses for Switching from DC-Drive to Constant

Figure 21:
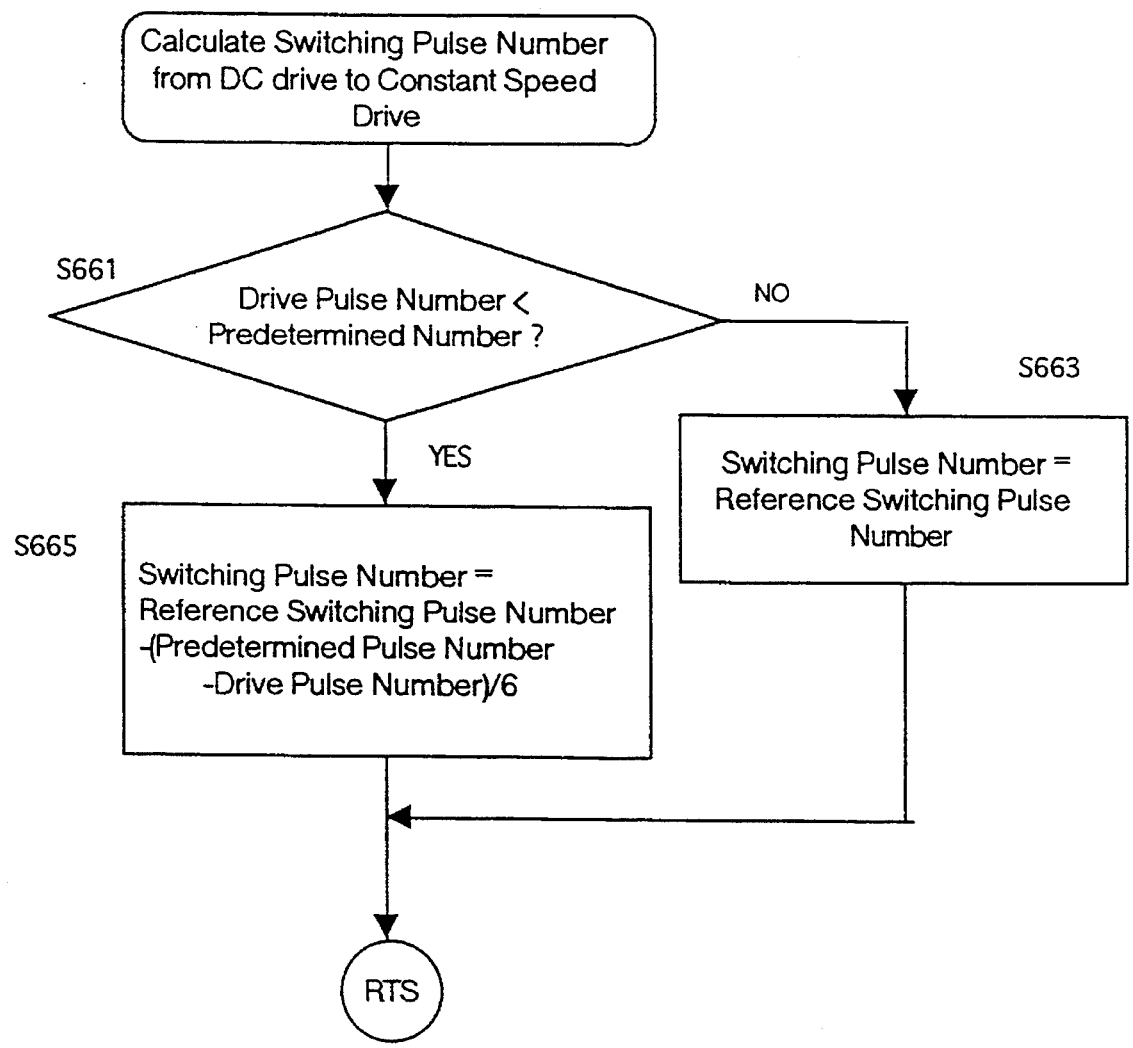
FIG. 21 is a flow chart of a switching pulse calculating operation to switch DC control to constant speed control, in the automatic focusing device shown in FIG. 1.

Speed Drive:

The sub-routine at step S631 will be discussed below with reference to FIG. 21.

To stop the AF motor which has been rotated by the DC-drive correctly at a predetermined position, the AF motor is decelerated in a stepwise manner by the PWM control (i.e., constant speed control) before the AF motor is completely stopped. The (remaining) pulse number to switch from the DC-drive to the constant speed control is calculated in the sub-routine shown in FIG. 21.

First, whether or not the drive pulse number is less than a reference pulse number is checked (step S661). If the drive pulse number is above the reference pulse number, the switching pulse number is replaced with the reference pulse number (step S663). Conversely, if the drive pulse number is below the reference pulse number, the switching pulse number is given by [reference pulse number—(predetermined pulse number — drive pulse number)/6] to prolong the time for the DC-drive (steps S661 and S665). The reference pulse number is determined by taking the inertia, etc., into account to stop the AF motor 39 (focusing lens assembly 53) at a predetermined position by the PWM control and depends on the camera body or the taking lens.

Thus, the remaining pulse number to switch from the DC-drive to the reverse brake by the PWM drive control is set.

Figure 22:
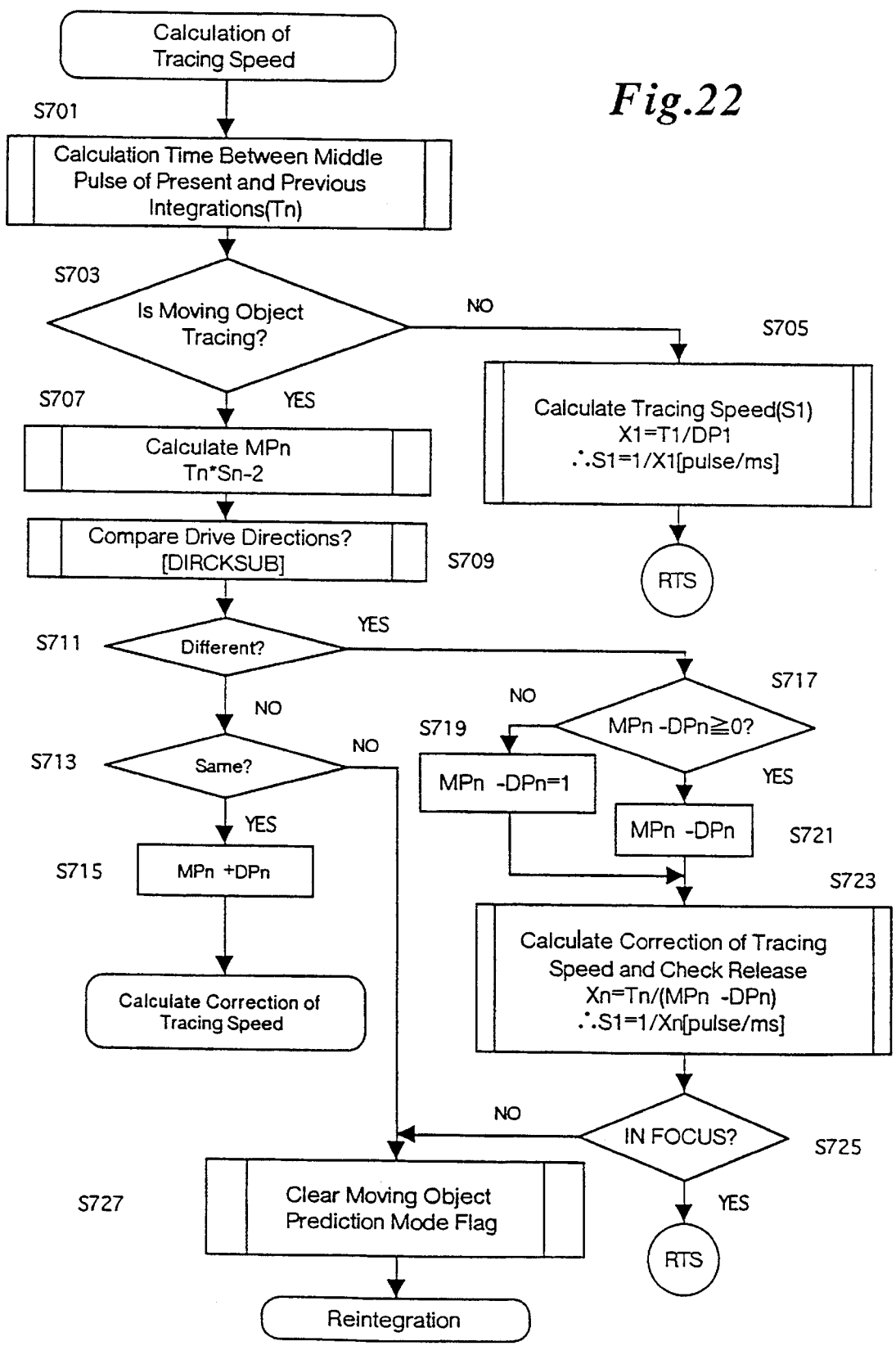
FIGS. 22 and 23 are flow charts of a moving object tracing speed calculating operation of the automatic focusing device shown in FIG. 1.
Figure 23:
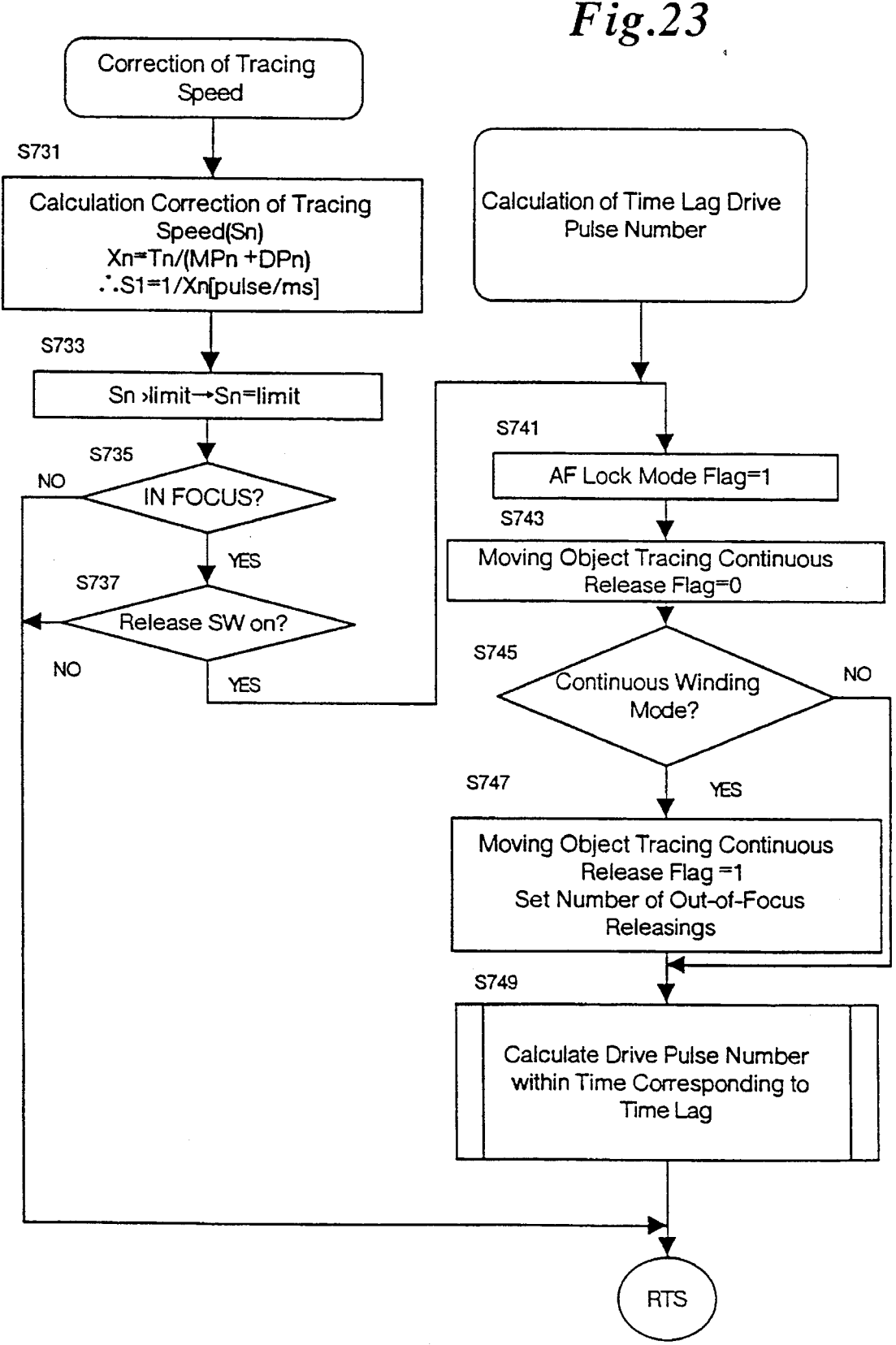

Calculation of Moving Object Tracing Speed:

The calculation of the moving object tracing speed will be described below with reference to a sub-routine shown in FIGS. 22 and 23. First, the space of time $T_n$ between the middle points of the previous integration time and the present integration time is calculated (step S701). The integration time varies depending on the object brightness. This is the reason that reference is made to the middle point of the integration time.

If control does not enter the moving object trace mode operation, the moving speed $S_n$ of the object before the trace is commenced is calculated (steps S703 and S705).

If control enters the moving object trace mode operation, the displacement pulse number $MP_{n-1}$, corresponding to an assumed displacement of the image of the moving object that would move within the time $T_N$, is calculated (steps S703 and S707). Thereafter, the driving directions of the lens assembly in the previous control and the present control are compared with each other (steps S709 and S711). If the drive directions are identical, the present defocus pulse number $DP_{n-1}$, is added to the displacement pulse number $MP_{n-1}$, and control proceeds to step S731 to perform the tracing speed correction calculation (steps S709, S711, S713 and S715).

If the drive directions are different, it is assumed that the object reduces its moving speed or stops, so that the lens assembly stops past a predetermined position, or the direction of the movement of the object is changed. In this case, the following operations are carried out.

First, whether the displacement pulse number $MP_{n-1}$ is larger than the defocus pulse number $DP_n$ ($MP_{n-1} - DP_n \geq 0$) is checked at step S717. If $MP_{n-1} - DP_n \geq 0$, the tracing speed $S_n$ is corrected by the following formulae at steps S717, S719 S723 or S717, S721 and S723);

$$X_n = T_n / (MP_{n-1} - DP_n)$$

$$S_n = 1/X_n$$

$$= (MP_{n-1} - DP_n)/T_n \quad \text{(pulse/ms)}$$

wherein $MP_{n-1} - DP_n = 1$ when the displacement pulse number $MP_{n-1}$ is not larger than or equal to the defocus pulse number $DP_n$.

If the in-focus state is obtained, control is returned. If the out-of-focus state occurs, the moving object prediction mode flag is cleared and control proceeds to the reintegration operation (steps S725 and S727).

If the drive directions are neither identical nor different. Namely, if an error occurs, the moving object prediction mode flag is cleared and control proceeds to the reintegration operation (steps S711, S713 and S727).

Correction of Tracing Speed:

In the calculation for correcting the tracing speed, the moving speed $S_n$ of the object image is calculated by the following equations (step S731);

$$X_n = T_n / (MP_{n-1} + DP_n)$$

$$S_n = 1/X_n$$

$$= (MP_{n-1} + DP_n)/T_n \quad \text{(pulse/ms)}$$

If the moving speed $S_n$ is above a maximum speed of the movement of the lens assembly of the associated camera it is impossible to drive the lens assembly at the moving speed $S_n$. Accordingly, the moving speed $S_n$ is set to be the limit value (step S733).

Thereafter, if an in-focus state is not obtained or if the release switch SWR is OFF regardless of the focus state, control is returned (steps S735 or S735 and S737). If the in-focus state is obtained and the release switch SWR is ON, the time lag drive pulse calculation is performed, as discussed below (steps S735, S737 and S741).

Calculation of Time Lag Drive Pulses:

In the calculation of the time lag drive pulses, the AF lock flag is set at "1" and the moving object tracing continuous release flag is cleared (steps S741 and S743). If the continuously winding mode (i.e., continuous photographing mode) is selected, the moving object tracing continuous release flag is set at "1" and the number of releasing operations to be effected at out-of-focus during the tracing of the moving object is set. Furthermore, the pulse number corresponding to the displacement within the time corresponding to the time lag is obtained (i.e., time corresponding to the time lag/tracing speed) (steps S745 through S749).

If the continuous winding mode (i.e., continuous photographing mode) is not selected, the moving object tracing continuous release flag is not set, and the pulse number corresponding to the displacement within the time corresponding to the time lag is calculated, in the same way as mentioned above (steps S745 and S749).

Figure 24:
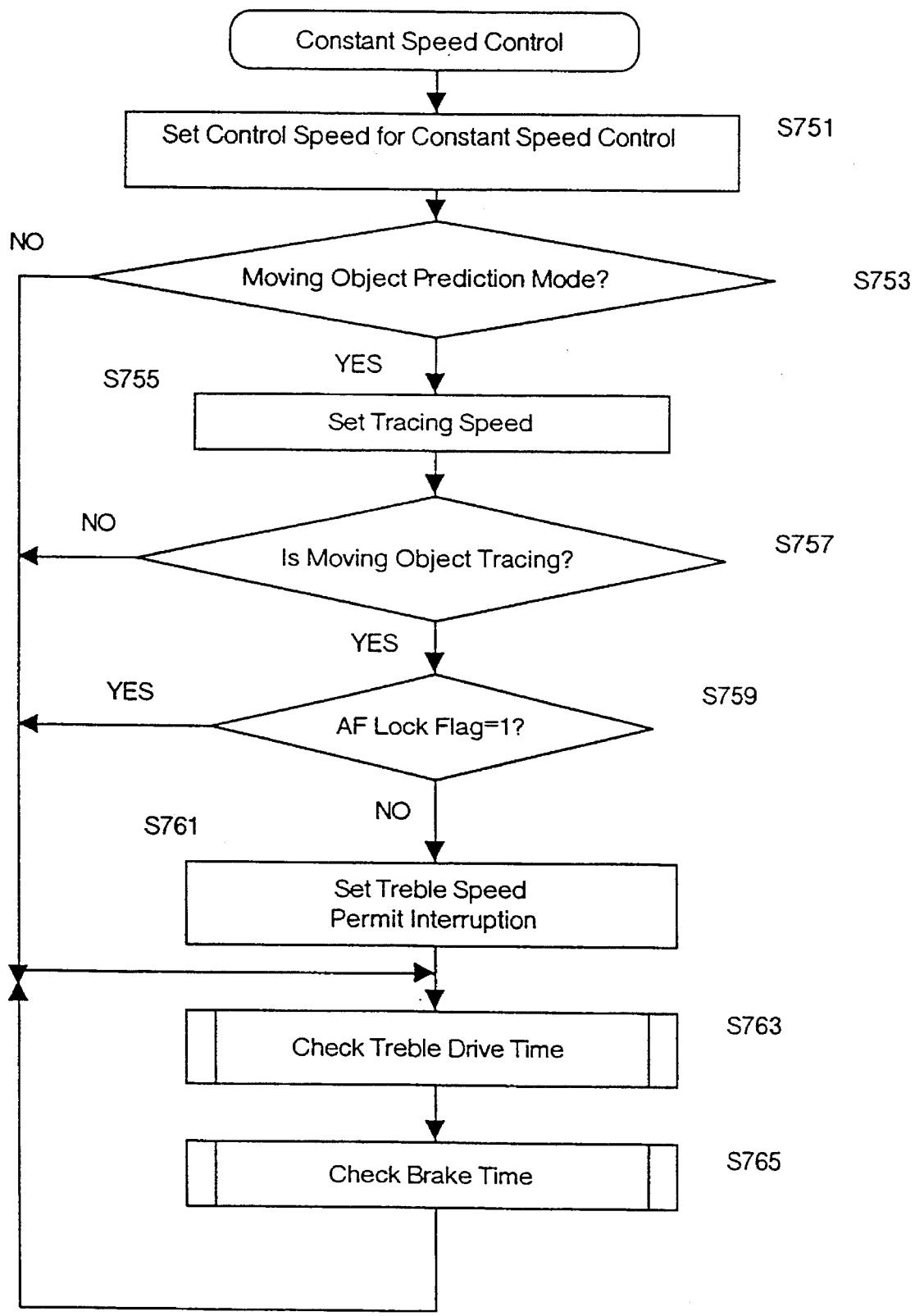
FIG. 24 is a flow chart of a constant speed control operation of the focusing device shown in FIG. 1.

Constant Speed Control:

The constant speed control in which the AF motor 39 is driven at a constant speed identical, for example, to the moving speed $S_n$ of the object image will be discussed below (see FIG. 24).

First, the drive speed for the constant speed control (PWM control) is set (step S751). If the moving object prediction mode flag is not set, or the AF lock flag is set, even if the moving object prediction mode flag is set, control jumps to step S763 without performing the trace of the moving object (steps S753 and S755). The driving speed is controlled at step S913 (see FIG. 29) in the pulse interruption operation (interruption by pulse).

Figure 25:
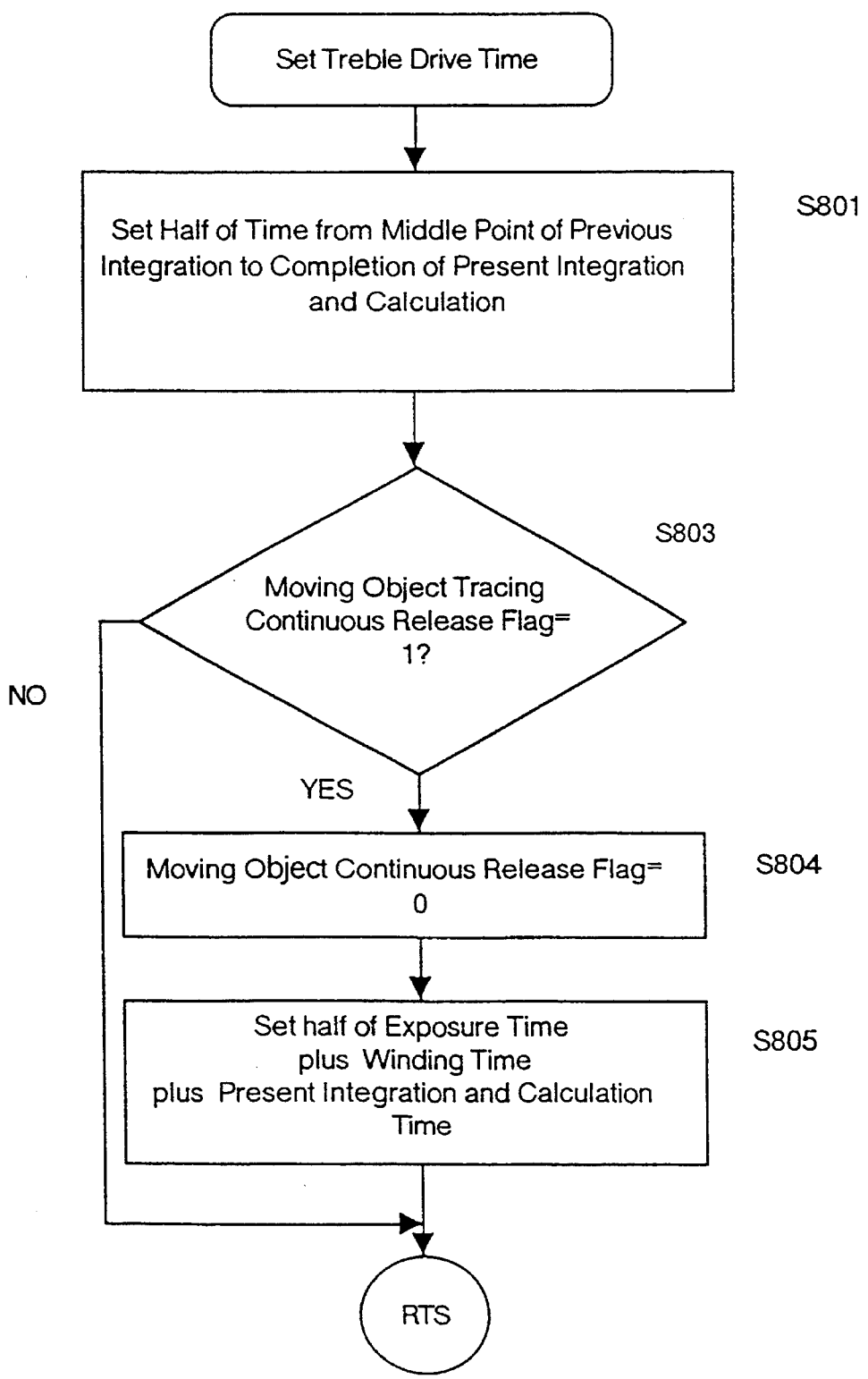
FIG. 25 is a flow chart of a triple speed control time setting operation of the automatic focusing device shown in FIG. 1.
Figure 26:
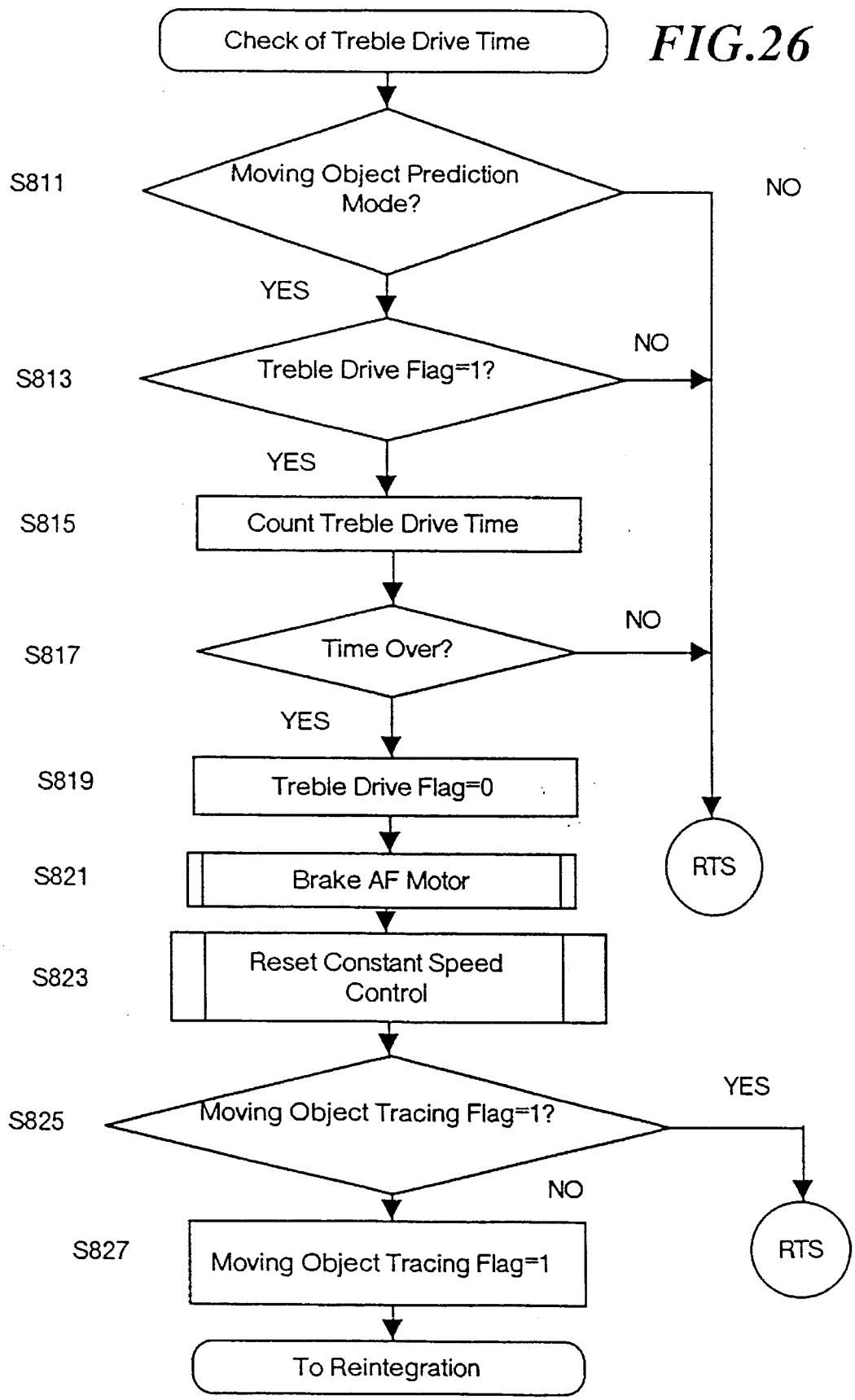
FIG. 26 is a flow chart of a triple speed control time checking operation of the automatic focusing device shown in FIG. 1.

If the moving object prediction mode flag is set, and the AF lock flag is not set, the tracing speed $S_n$ is set (step S755). If the moving -object tracing flag is not set (step S757), control skips to step S763 to drive the lens assembly at the tracing speed $S_n$. If the moving object tracing flag is set, a speed three times the tracing speed $S_n$ is set to drive the lens assembly (steps S759 through S763). At step S761, control permits the interruption to perform the constant speed drive by the constant speed control and the input pulse. At step S763, the sub-routine for checking the treble drive time, shown in FIG. 25, is called.

Setting of Treble Drive Time:

The setting operation of the treble drive time (step S565) (FIG. 18) will be explained below with reference to FIG. 25.

Half of the time from the middle point of the previous integration to the completion of the present integration and calculation is set (step S801). If the moving object tracing continuous release flag is cleared, control is returned, and if the moving object tracing continuous release flag is set at "1"(step S803), the moving object continuous release flag is cleared (step S804). Thereafter, half of the time defined by (exposure time+ winding time+ present integration and calculation time) is set (step S805).

Checking of Treble Drive Time:

In the treble drive time checking operation (FIG. 26) at step S763 (FIG. 24), whether or not the moving object prediction mode flag is set and whether or not the treble drive flag is set are checked at steps S811 and S813. If the moving object prediction mode flag is not set, or if the treble drive flag is not set, even if the moving object prediction mode flag is set, control is returned to step S762.

If the moving object prediction mode flag and the treble drive flag are set, the treble drive time is counted. If the counted time does not exceed a set time of the counter, control is returned to step S762 to continue with the treble drive (steps S811 through S817). If the counted time reaches the set time, the treble drive flag is reset to "0"to stop the treble drive, and the AF motor 39 is braked (steps S819 and S821). Thereafter, the constant speed drive is reset (step S823). As a result of the "reset" of the constant speed drive, the drive speed which has been set to be three times the tracing speed $S_n$ is changed to the tracing speed $S_n$. If the moving object tracing flag is set at "1"(step S825), control is returned to S763. Conversely, if the moving object tracing flag is not set at "1"(step S825), the moving object tracing flag is set at "138 at step S827, and control proceeds to the reintegration operation.

Figure 27:
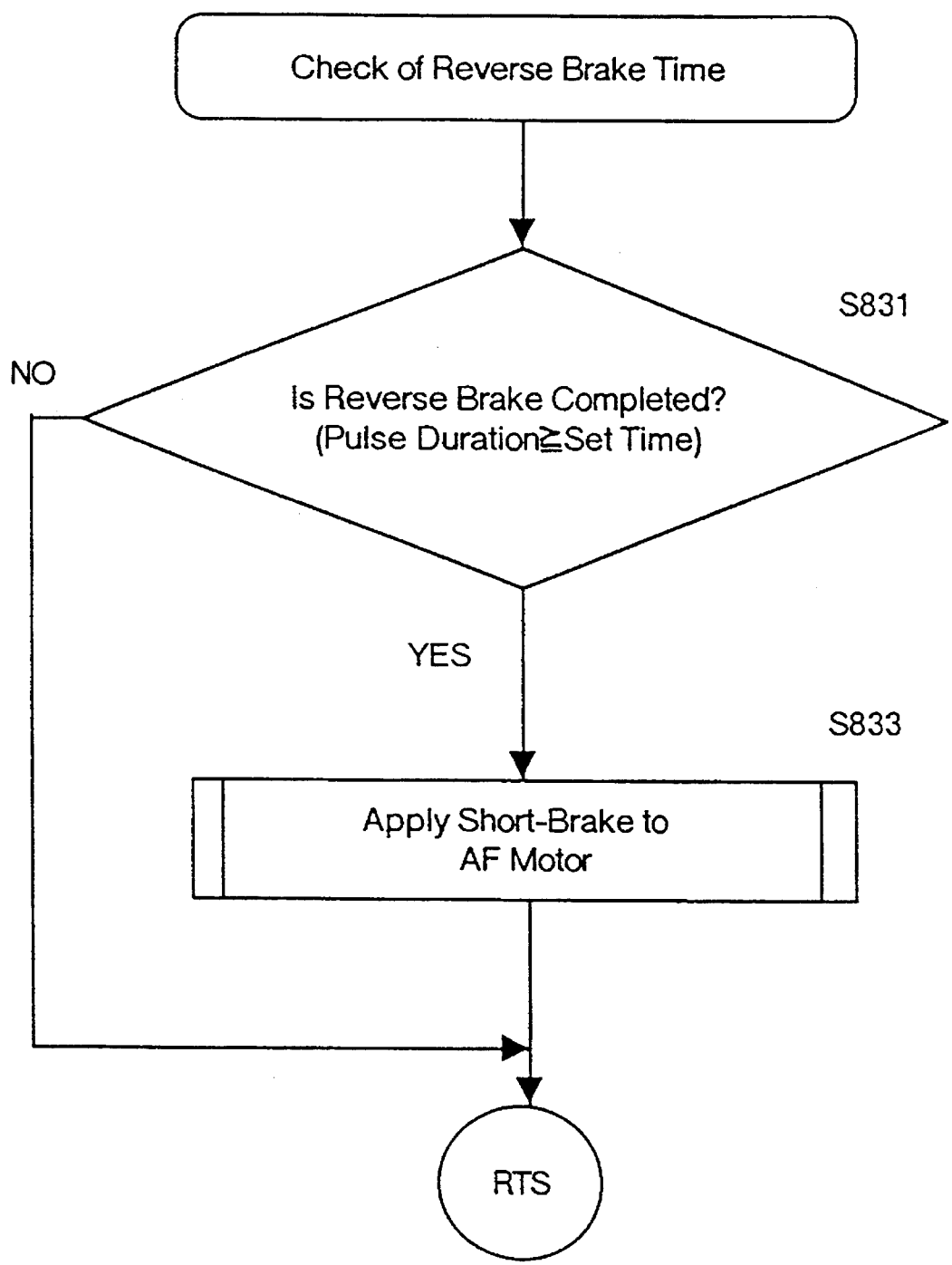
FIG. 27 is a flow chart of a reverse brake time checking operation of the automatic focusing device shown in FIG. 1.

After control is returned to step S763, control proceeds to step S765 to call the reverse brake time checking sub-routine. In the reverse brake time checking sub-routine as shown in FIG. 27, whether or not the reverse brake time is over (i.e., whether the pulse interval or duration is greater than or equal to the reverse brake time) is checked. If the reverse brake time is not over, the input terminal of the Af motor 39 is short-circuited circuited to apply the short-brake to the AF motor 39. Control is returned to step S765. Conversely, if the reverse brake time is not over, control is returned without performing any operation.

When the reverse brake time is over, the duration (interval) of the pulses output from the encoder 41 is longer than the reverse brake time, that is, the rotational speed of the AF motor 39 is reduced to a predetermined speed. Thus, the AF motor 39 can be quickly decelerated to a predetermined speed by the reverse brake.

Figure 28:
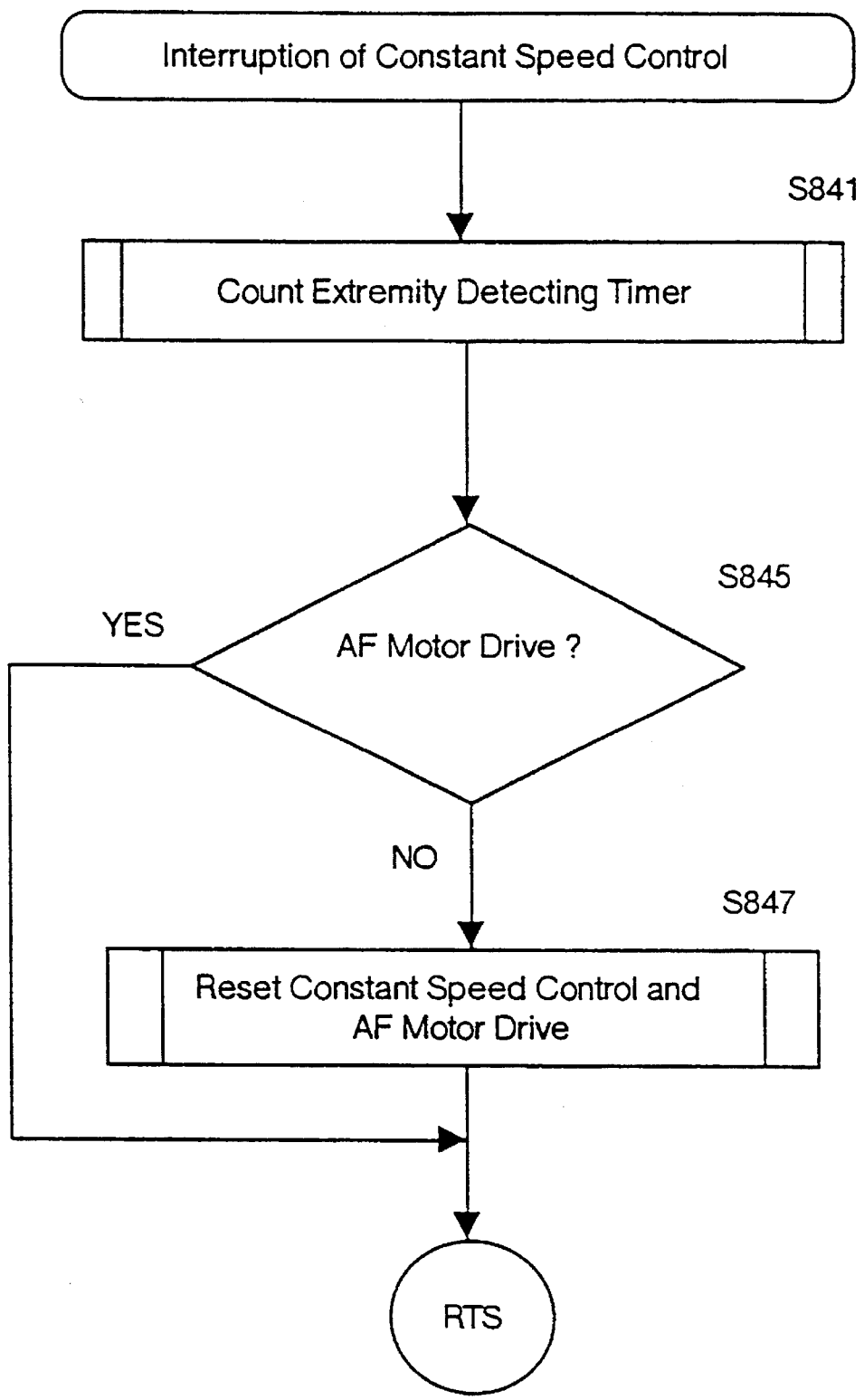
FIG. 28 is a flow chart of a constant speed control time interruption operation of the automatic focusing device shown in FIG. 1.

Interruption of Constant Speed Control:

In the sub-routine for the constant speed control interruption, shown in FIG. 28, the constant speed control is interrupted when the AF pulse is not output for a predetermined time.

In this sub-routine, the set time of the extremity detecting timer is counted at step S841. If the AF motor is driven, control is directly returned, but if no AF motor is driven, the constant speed control is reset and control is returned to step at which the interruption is effected (steps S841 through S845). As a result of the reset of the constant speed control, the set value of the drive speed is renewed during the PWM control.

Figure 29:
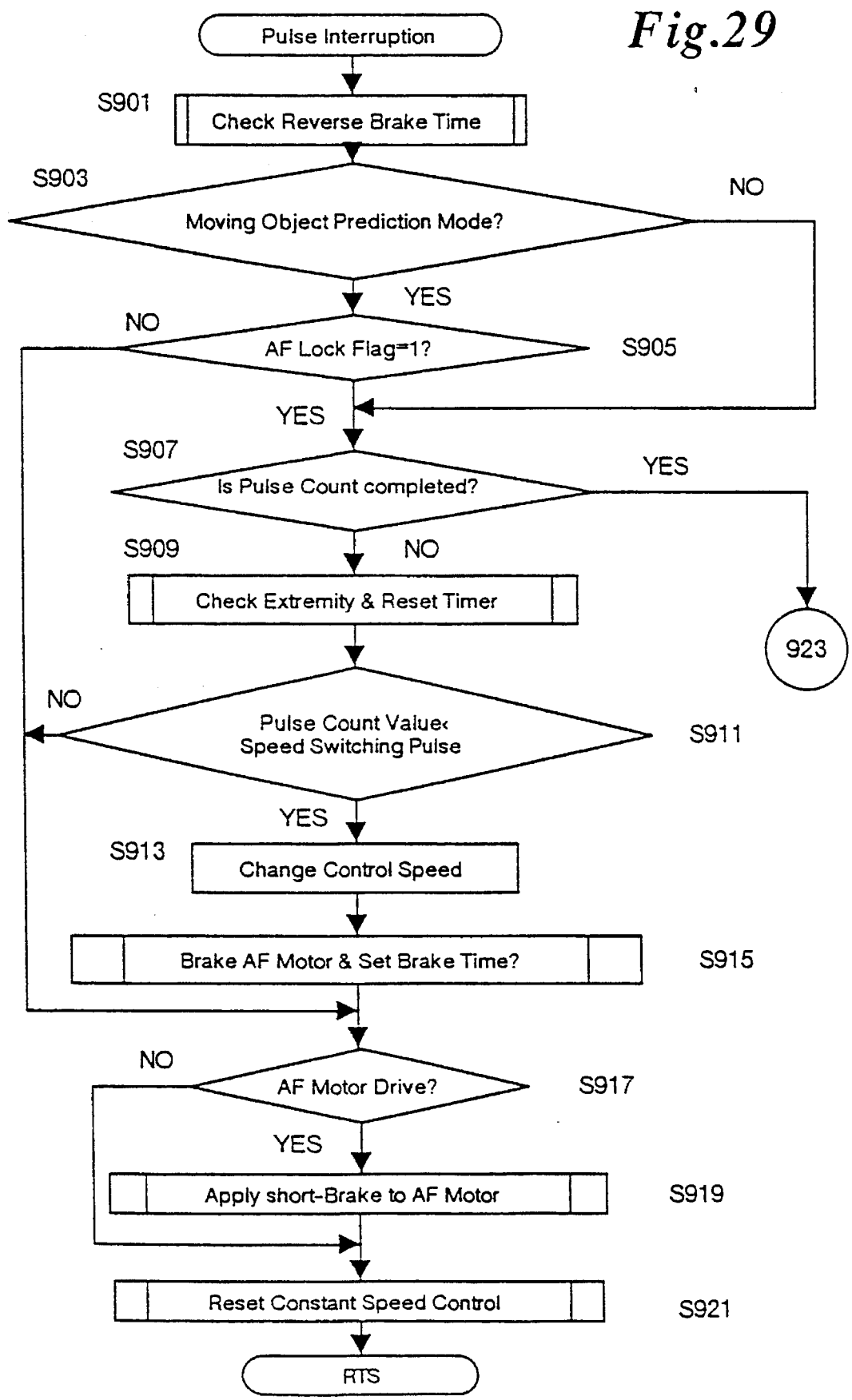
FIGS. 29 and 30 are flow charts of a pulse interruption operation of the automatic focusing device shown in FIG. 1; and, FIG. 31 is a flow chart of a reverse brake time setting operation of the automatic focusing device shown in FIG. 1.
Figure 30:
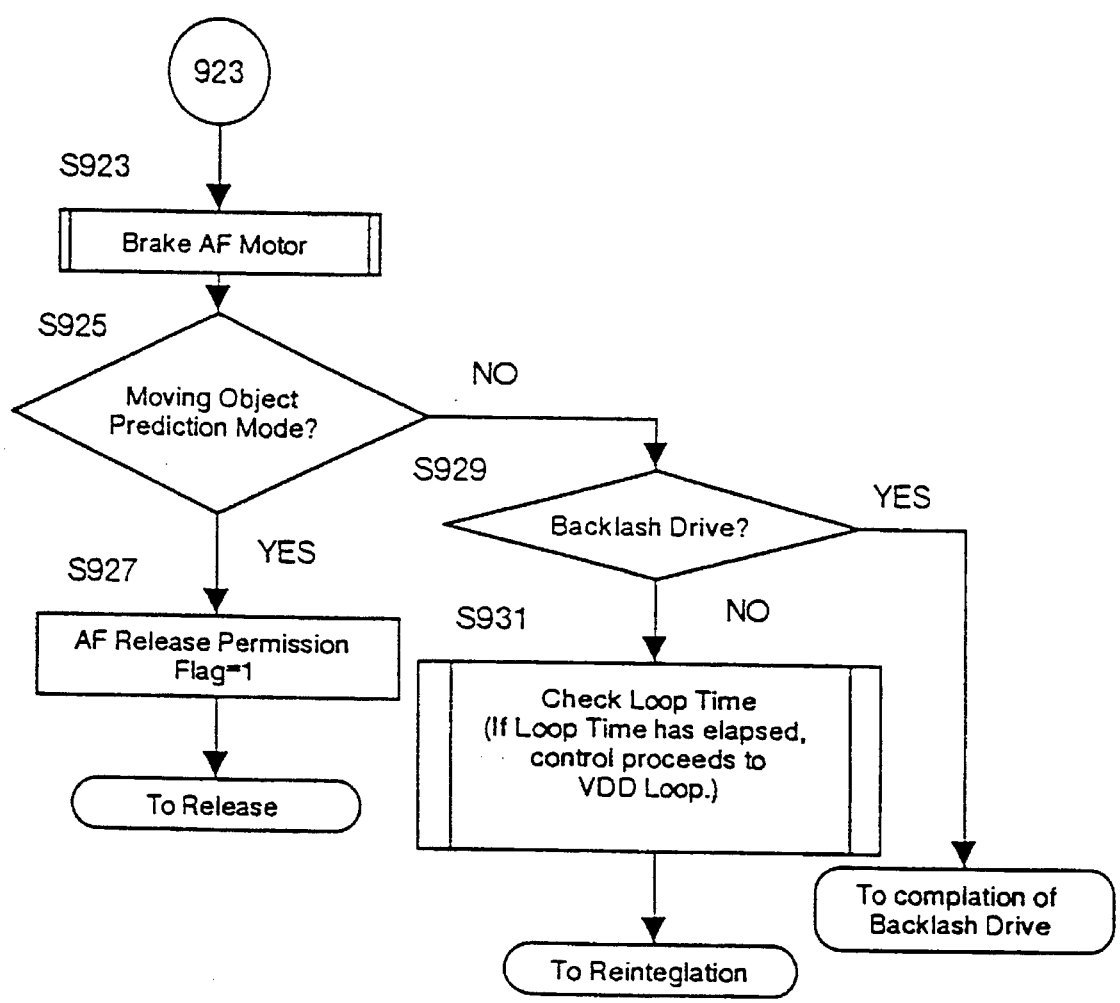

Interruption by Input of Pulses:

FIGS. 29 and 30 show a flow chart of the interruption by the input of the pulses that occurs every time the AF pulses are output from the encoder 41.

In this operation, the reverse brake time is checked (step S901). If the moving object prediction mode flag is cleared, control skips to step S907. If the moving object prediction code is not cleared, and the AF lock flag is cleared, control skips to step S917. If the moving object prediction mode flag and the AF lock flag are set at "1" whether or not the counting of the pulses is completed is checked at step S907.

If the counting of the pulses is not completed, the extremity check operation (FIG. 14) and the extremity detecting timer are reset (step S909). The extremity detecting timer detects the time at which no pulse is output from the encoder 41 when the focusing lens assembly 53 reaches one of the extremities.

If the value of the pulse counter 35d is above the speed switching pulse number, control jumps to step S917, since no deceleration is effected. Conversely, if the value of the pulse counter 35d is below the speed switching pulse number, the control speed is changed to decelerate the tracing speed. Thereafter, the AF motor 39 is subject to the reverse brake and the reverse brake time is set (steps S911 through S915).

Thereafter, control proceeds to step S917 in which whether or not the AF motor is driven is checked. If the AF motor is driven, the AF motor 39 is subject to the short-brake. Then, the constant speed control is reset (steps S919 and S921). Conversely, if the AF motor is not driven, the constant speed control is reset without applying the short-brake to the AF motor 39. The "reset" of the constant speed control is the same as that at step S847.

In the checking operation at step S907, if the pulse counting is completed, control proceeds to step S923 to brake and stop the AF motor 39. If the moving object prediction mode flag is set, the AF release permission flag is set to permit the releasing at the AF mode (steps S925 and S927).

If the moving object prediction mode flag is not set, whether or not the backlash drive flag is set is checked at step S929. If the backlash drive flag is set, the loop time checking sub-routine is called (step S931). If the loop time has elapsed, control jumps to step S109. Conversely, if loop time has not elapsed, control is returned to perform the reintegration (steps S929 and S931).

The operations from steps S901 to S931 are performed every time the pulse is output from the encoder 41 during the constant speed control.

Figure 31:
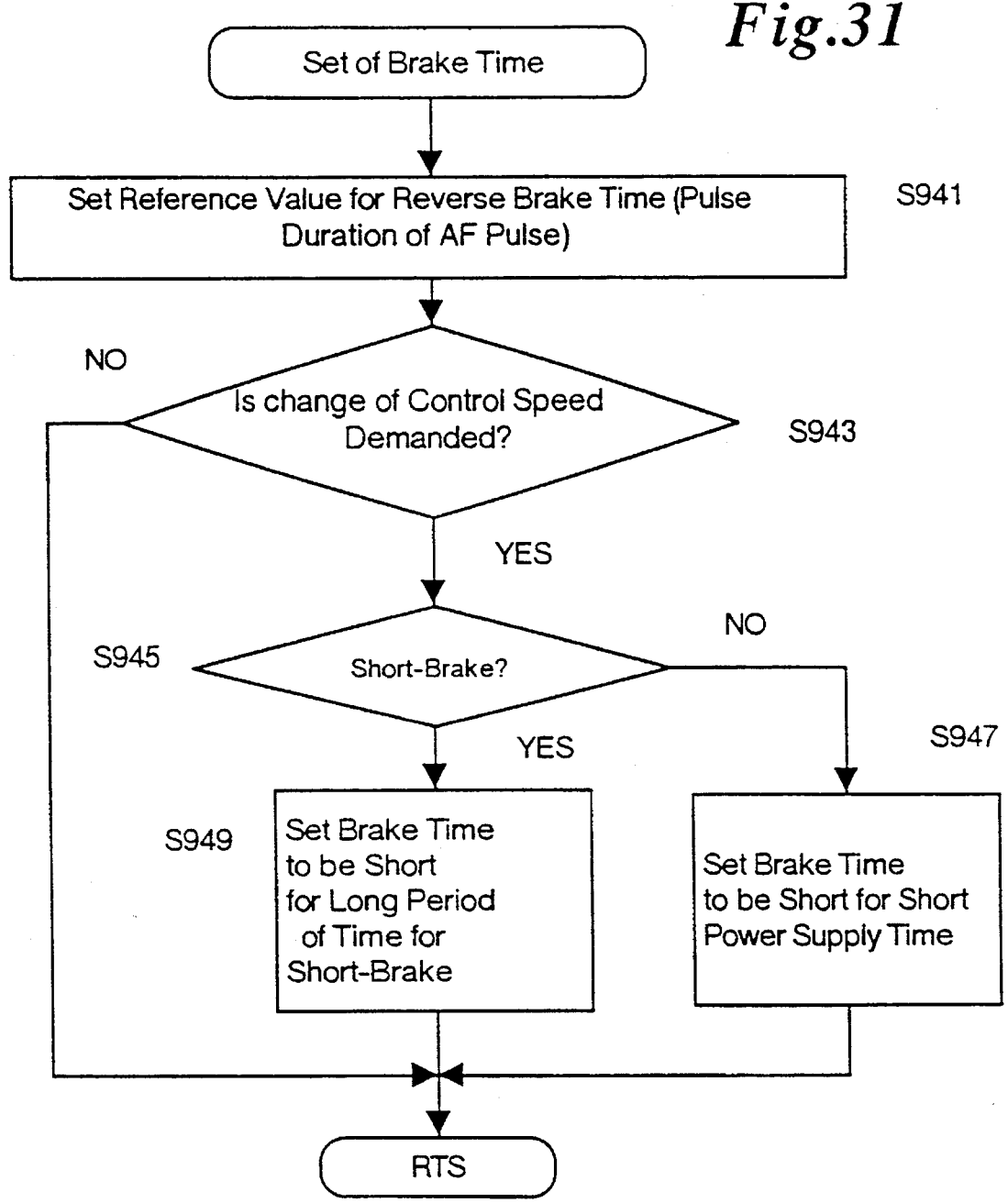

Setting of Reverse Brake Time:

The setting operation of the reverse brake time at step S649 or step S915 will be described below with reference to FIG. 31.

First, the reverse brake time, i.e., the time which defines a reference value of the duration of the AF pulses to stop the reverse brake is set (step S941). Thereafter, if no change of the constant control speed is demanded, that is, if the power supply time rate by the present PWM drive should not be changed, control is returned (step S943).

At the time of change of the constant control speed, if a short-brake is not applied to the AF motor 39 (i.e., the power supply to the AF motor is continued), the time proportional to the power supply time is set, and control is returned to step S649 or step S915. If the short brake is applied to the AF motor, a predetermined time in reverse proportion to the short brake time is set, and control is returned to step S649 or step S915 (steps S945 and S949).

The set time at step S947 is defined by

[reference value −{(correction value ×(constant speed control time− power supply time)}] and, the set time at step S949 is defined by {reference value −(correction value × short brake time) }.

The above mentioned operations are repeated when control passes step S649 in the AF operation or step S915 in the interruption operation ( FIG. 29 ) by the outpour of the AF pulses during the AF motor drive mentioned above.

As can be seen from the above discussion, in an AF single lens reflex camera according to the present invention, since the AF motor 39 is braked to change the speed in accordance with the rotational speed thereof, the AF motor 39 which has been rotated at high speed ( and accordingly, the focusing lens assembly 53 ) can be immediately reduced to a constant speed or can be immediately stopped. Consequently, it is possible to prolong the DC-drive time of the AF motor 39 with a lesser pulse number, thus resulting in a fast focus adjustment.

As can be understood from the foregoing, when the moving object prediction mode is selected at the continuous photographing mode (i.e., continuous winding mode ), even if the moving object is temporarily out of the object distance measuring zone during the trace of the moving object, the moving object tracing AF operation continues for a while, wherein the lens assembly is moved at a speed identical to the tracing speed at the moment of the deviation from the object distance measuring zone, so that continuous pictures of a moving object can be taken in focus.

Although the above discussion has been directed to an automatic focus control apparatus of a single lens reflex camera, the motor control apparatus of the present invention can be applied to a power zoom lens or a lens shutter type camera.

In summary, according to the present invention, since the motor is braked to change or stop the rotation thereof, it is possible to change or quickly stop the rotation of the AF motor within an extremely short period of time. Furthermore, according to the present invention, it takes less time to restart the motor since the motor can be quickly stopped. Moreover, if an automatic focus adjusting apparatus including a motor controller according to the present invention is applied, for example, to a camera, the time necessary to stop the motor can be reduced. Accordingly, an in-focus state can be quickly obtained. In particular, since the motor can be rotated at high speed even for a short displacement of the lens assembly and can be quickly stopped or reduced to a predetermined speed, a highly responsive focus adjusting apparatus can be obtained.

I claim:

1. A motor control apparatus, comprising:

speed detecting means for detecting a rotational speed of a motor;

a first motor operation mode including a dc operation mode;

a second motor operation mode including a pulse width modulation operation mode;

means for applying a reverse brake for a duration of time in accordance with said detected rotational speed of the motor, when the motor is operating in said first operation mode, to operate the motor in said second operation mode;

wherein application of said reverse brake reduces the detected rotational speed of the motor to control a timing of transition between said first motor operation mode and said second motor operation mode;

said means for applying including means for reversing an electric current supplied to said motor; and short-circuit means for stopping said motor.

2. A motor control apparatus of claim 1, further comprising:

said speed detecting means includes means for detecting an angular velocity of the motor;

motor driving means for driving the motor in a direction based on a predetermined condition;

means for controlling the motor, wherein, when the motor is instructed to be stopped, the angular velocity is reduced to a predetermined value, said controlling means being actuated in accordance with the angular velocity detected by said means for detecting.

3. The motor control apparatus of claim 2, wherein said controlling means includes a means for reversing an electric current supplied to said motor.

4. The motor control apparatus of claim 2, wherein said controlling means decelerates said motor until the angular velocity of said motor is reduced to a predetermined value, upon decelerating, stopping or reversing the motor.

5. The motor control apparatus of claim 2, wherein said angular velocity detecting means comprises an encoder which outputs pulses in association with rotation of said motor.

6. The motor control apparatus of claim 5, further comprising:

a means for metering a duration of pulses output from said encoder to detect a rotational speed of said motor.

7. The motor control apparatus of claim 6, wherein said means for reversing an electric current reversing means is stopped when no pulse is output from said encoder for a predetermined period of time.

8. The automatic focusing apparatus of claim 7, further comprising:

a short-circuit means for decelerating said motor to zero angular velocity after the angular velocity of said motor is reduced to said predetermined value by said controlling means.

9. The motor control apparatus of claim 8, wherein said short circuit means short circuits said motor when no power is supplied.

10. The motor control apparatus of claim 6, wherein said controlling means drives said motor at a constant speed by a PWM drive control in accordance with an interval of pulses output from said encoder.

11. The motor control apparatus of claim 7, wherein said controlling means decelerates said motor until the angular velocity of said motor is reduced to a predetermined value by said PWM drive control.

12. The motor control apparatus of claim 11, wherein said controlling means controls the angular velocity of said motor by controlling a duty ratio of power supply and non-supply to said motor.

13. The motor control apparatus of claim 12, wherein upon changing the angular velocity of said motor, said controlling means is effected for a period of time proportional to a power supply time to said motor by said PWM drive control when said power is supplied to said motor by said PWM drive control, and for a period of time in reverse proportion to a non-supply time when no power is supplied by said PWM drive control.

14. The motor control apparatus of claim 13, wherein said controlling means decelerates said motor at a predetermined speed by said PWM drive control after said motor is driven with a DC current drive control.

15. The motor control apparatus of claim 14, wherein said controlling means determines a drive pulse number based on object distance data, said drive pulse number corresponding to a number of rotations of said motor from a beginning of said DC drive control until said motor is stopped.

16. The motor control apparatus of claim 15, wherein said controlling means switches said DC drive control to said PWM drive control when said motor rotates a predetermined number of times.

17. The motor control apparatus of claim 15, wherein said controlling means sets a switching pulse number at which said DC drive control is to be switched to said PWM drive control.

18. The motor control apparatus of claim 17, wherein said controlling means detects a number of pulses output from said encoder when said DC drive control begins, and counts down from said drive pulse number in steps of one for every rotation of said motor, said DC drive control being switched to said PWM drive control when said count down number is equal to said switching pulse number.

19. The motor control apparatus of claim 18, wherein if said drive pulse number is greater than or equal to a predetermined pulse number, said switching pulse number is replaced with a reference pulse number.

20. The automatic focusing apparatus of claim 18, wherein if said drive pulse number is below a predetermined pulse number, said DC drive control is continued until said count down number reaches said switching pulse number, said switching pulse number being given by the following equation:

$$SPN=RPN-(PPN-DPN)/6$$

wherein,

SPN is said switching pulse number;

RPN is a reference pulse number;

PPN is said predetermined pulse number; and,

DPN is said drive pulse number.

21. The motor control apparatus of claim 19, wherein said reference pulse number is determined in accordance with an inertia of said motor and said focusing lens assembly.

22. The motor control apparatus of claim 17, further comprising:

a short-circuit means for decelerating said motor to zero angular velocity after the angular velocity of said motor is reduced to said predetermined value corresponding to said switching pulse number.

23. The motor control apparatus of claim 22, wherein said short circuit means short circuits said motor when no power is supplied.

24. The motor control apparatus of claim 1, said duration of time is related to a pulse data interval from an encoder.

25. The motor control apparatus of claim 24, said speed detecting means detects a pulse interval, said pulse interval being inversely related to said motor speed;

wherein said reverse brake is applied until said pulse interval is larger than said pulse data interval.

26. The motor control apparatus of claim 1, wherein said reverse brake produces a rotational force on the motor reducing said rotational speed.

27. A motor control apparatus comprising:

speed detecting means for detecting a rotational speed of a motor; and means for applying a reverse brake for a predetermined duration of time in accordance with said detected rotational speed of the motor when the motor is being stopped;

wherein application of said reverse brake reduces the detected rotational speed of the motor to control a timing of transition between motor operation modes;

wherein said apparatus is associated with an automatic focus camera and further comprising:

means for obtaining defocus data related to object distance and for outputting auto-focus pulse data indicative of said object distance;

controlling means for controlling a pulse width modulating control;

a plurality of driving means comprising dc drive means and constant speed drive means, said plurality of driving means selectively driving the motor via said controlling means;

pulse data means, coupled to said speed detecting means, for providing pulse data related to said detected rotational speed when said driving means is selectively switched from the dc drive means to the constant speed drive means;

comparing means for comparing said pulse data related to said detected rotational speed and said auto-focus pulse data, wherein said reverse brake is applied in accordance with an output of said comparing means.

28. The motor control apparatus of claim 27, wherein said applying means is actuated when the output of said comparing means indicates said auto-focus pulse data is less than said pulse data related to said detected rotational speed.

29. The motor control apparatus of claim 2, wherein said apparatus is associated with an automatic focus camera; and further comprising:

object distance data detecting means;

an optical system, including a focusing lens assembly which can be driven by said motor;

said predetermined condition comprising object distance data obtained by said object distance data detecting means to move said focusing lens assembly.

30. The motor control apparatus of claim 29, wherein said object distance data is an amount of defocus.

* * * * *

UNITED STATES PATENT AND TRADEMARK OFFICE
CERTIFICATE OF CORRECTION

PATENT NO. : 5,498,944
DATED : March 12, 1996
INVENTOR(S) : Masahiro NAKATA

It is certified that error appears in the above-indentified patent and that said Letters Patent is hereby corrected as shown below:

At column 24, line 34 (claim 7, line 2), delete "reversing means".

At column 24, line 37 (claim 8, line 1), change "automatic focusing" to ---motor control---.

At column 26, line 26 (claim 27, line 21), change "dc" to ---DC---.

At column 26, line 33 (claim 27, line 28), change "dc" to ---DC---.

Signed and Sealed this

Twenty-ninth Day of April, 1997

Attest:

BRUCE LEHMAN

*Attesting Officer*  Commissioner of Patents and Trademarks